United States Patent
Hayakawa

(10) Patent No.: US 8,861,011 B2
(45) Date of Patent: Oct. 14, 2014

(54) PRINT IMAGE PROCESSING SYSTEM AND NON-TRANSITORY COMPUTER READABLE MEDIUM

(71) Applicant: Fuji Xerox Co., Ltd., Tokyo (JP)

(72) Inventor: Michio Hayakawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 14/019,181

(22) Filed: Sep. 5, 2013

(65) Prior Publication Data

US 2014/0104644 A1 Apr. 17, 2014

(30) Foreign Application Priority Data

Oct. 11, 2012 (JP) ................................. 2012-225810

(51) Int. Cl.
*G06F 3/12* (2006.01)
*G06K 15/02* (2006.01)

(52) U.S. Cl.
CPC ............ *G06F 3/1297* (2013.01); *G06F 3/1244* (2013.01); *G06K 15/18* (2013.01); *G06F 3/1285* (2013.01); *G06F 3/1211* (2013.01)
USPC ........ 358/1.15; 358/1.13; 358/1.14; 345/505; 711/113; 711/118; 711/119; 711/120

(58) Field of Classification Search
CPC .......... G06K 15/1857; G06K 15/1817; G06K 15/851; G06K 15/1859; G06F 3/12; G06F 3/1211; G06F 3/1247; G06F 2003/0691
USPC ........ 358/1.14, 1.13, 1.15; 345/505; 711/133, 711/118–120
See application file for complete search history.

(56) References Cited

U.S. PATENT DOCUMENTS

| | | | |
|---|---|---|---|
| 2010/0079798 | A1 | 4/2010 | Iguchi |
| 2011/0075165 | A1 | 3/2011 | Hayakawa |
| 2011/0267645 | A1 | 11/2011 | Miyazaki |
| 2012/0133964 | A1 | 5/2012 | Hayakawa |
| 2012/0133984 | A1* | 5/2012 | Hayakawa ................... 358/1.16 |
| 2013/0077104 | A1 | 3/2013 | Nakamura |
| 2014/0104645 | A1* | 4/2014 | Hayakawa ................... 358/1.15 |
| 2014/0126008 | A1* | 5/2014 | Hayakawa ................... 358/1.13 |

FOREIGN PATENT DOCUMENTS

| | | |
|---|---|---|
| JP | 2000-335022 A | 12/2000 |
| JP | 2010-88104 A | 4/2010 |
| JP | 2010-109967 A | 5/2010 |
| JP | 2010-146351 A | 7/2010 |
| JP | 2011-25422 A | 2/2011 |

(Continued)

*Primary Examiner* — Jacky X Zheng
(74) *Attorney, Agent, or Firm* — Sughrue Mion, PLLC

(57) ABSTRACT

A print image processing system includes plural logical page interpretation units, a dual interpretation unit, a cache memory, an assignment unit, and a print image data generation unit. The logical page interpretation units interpret assigned logical pages in input print data in parallel. The dual interpretation unit interprets an assigned logical page in the print data or an element to be cached which is included in the logical page. The cache memory stores interpretation results of elements to be cached. The assignment unit assigns logical pages to the dual interpretation unit and the logical page interpretation units. The print image data generation unit generates print image data for the logical pages using the interpretation results output from the logical page interpretation units or the dual interpretation unit and the interpretation results stored in the cache memory. The print image data generation unit supplies the print image data to a printer.

15 Claims, 24 Drawing Sheets

(56) References Cited

FOREIGN PATENT DOCUMENTS

| | | |
|---|---|---|
| JP | 2011-67993 A | 4/2011 |
| JP | 2011-70337 A | 4/2011 |
| JP | 2011-150535 A | 8/2011 |
| JP | 2011-230470 A | 11/2011 |
| JP | 4905604 B1 | 3/2012 |
| JP | 2012-116078 A | 6/2012 |
| JP | 2012-118738 A | 6/2012 |
| JP | 2012-118746 A | 6/2012 |

* cited by examiner

FIG. 17

| CACHE ID (HASH VALUE) | KEYWORD DATA | CACHE LOCATION | ACCESS COUNT VALUE | REFERENCE COUNT VALUE |
|---|---|---|---|---|
| 0x0010 | FORM ID = 1, LINE WIDTH = 1, LINE CAP = round, .... | ADDRESS = 0x04000000 SIZE = 0x00000100 | 3 | 1 |
| 0x0340 | FORM ID = 2, LINE WIDTH = 0, LINE CAP = cut, .... | ADDRESS = 0x04002000 SIZE = 0x00000800 | 20 | 1 |
| 0x0530 | FORM ID = 3, LINE WIDTH = 0, LINE CAP = cut, .... | ADDRESS = 0x00000000 SIZE = 0x00000000 (INVALID) | 1 | 0 |

FIG. 20

| CACHE ID (HASH VALUE) | KEYWORD DATA | CACHE LOCATION | ACCESS COUNT VALUE | REFERENCE COUNT VALUE | RECENT ACCESS COUNT VALUE |
|---|---|---|---|---|---|
| 0x0010 | FORM ID = 1, LINE WIDTH = 1, LINE CAP = round, .... | ADDRESS = 0x04000000 SIZE = 0x00000100 | 123 | 0 | 0 |
| 0x0340 | FORM ID = 2, LINE WIDTH = 0, LINE CAP = cut, .... | ADDRESS = 0x04002000 SIZE = 0x00000800 | 130 | 1 | 21 |
| 0x0530 | FORM ID = 3, LINE WIDTH = 0, LINE CAP = cut, .... | ADDRESS = 0x00000000 SIZE = 0x00000000 (INVALID) | 88 | 1 | 12 |

PRINT IMAGE PROCESSING SYSTEM AND NON-TRANSITORY COMPUTER READABLE MEDIUM

CROSS-REFERENCE TO RELATED APPLICATIONS

This application is based on and claims priority under 35 USC 119 from Japanese Patent Application No. 2012-225810 filed Oct. 11, 2012.

BACKGROUND (i) Technical Field

The present invention relates to a print image processing system and a non-transitory computer readable medium.

(ii) Related Art

In general, print document data sent from a personal computer to a printer is written in a page description language (PDL) such as PostScript (registered trademark) or Portable Data Format (PDF) (ISO 32000-1). In a printer, print document data is converted into bitmap (also referred to as raster) image data using a data processing device called a raster image processor (RIP), and the image data is printed by a print engine. In addition to printers of a type in which PDL data is converted directly into a raster image, there are also available printers configured to perform two-step conversion in which PDL data is converted into intermediate language data having finer granularity than a PDL command, such as a display list, and the intermediate language data is buffered and is converted into bitmap data.

In other systems of the related art, conversion of PDL data into bitmap or intermediate language image data is performed by multiple data processing devices in parallel in predetermined units such as pages.

In the related art, furthermore, a certain data processing device converts a PDL document element (object) in print data into bitmap or intermediate language data, and caches the resulting data in a cache memory in association with information identifying the document element so that when the same data processing device or a different data processing device later converts the same document element, the cached data may be used to omit the conversion process.

SUMMARY

According to an aspect of the invention, there is provided a print image processing system including plural logical page interpretation units, a dual interpretation unit, a cache memory, an assignment unit, and a print image data generation unit. The plural logical page interpretation units interpret assigned logical pages to be processed in input print data in parallel to obtain interpretation results. The dual interpretation unit interprets an assigned logical page to be processed in the print data or interprets an element to be cached which is included in the logical page to obtain an interpretation result. The cache memory stores interpretation results of elements to be cached. The assignment unit assigns a logical page to be processed to each of the plural logical page interpretation units and assigns a logical page to be processed to the dual interpretation unit. The print image data generation unit generates print image data for the logical pages to be processed, using the interpretation results of the logical pages output from the logical page interpretation units or the interpretation result of the logical page output from the dual interpretation unit and using the interpretation results of the elements to be cached stored in the cache memory. The print image data generation unit supplies the generated print image data to a printer. Each of the plural logical page interpretation units has a first page processing mode and a second page processing mode. The first page processing mode is a mode in which a logical page to be processed is interpreted to obtain an interpretation result and the interpretation result is output. In a case where the logical page to be processed includes an element to be cached, the element to be cached is further interpreted to obtain an interpretation result and the interpretation result is incorporated into the interpretation result of the logical page to be processed. The second page processing mode is a mode in which a logical page to be processed is interpreted to obtain an interpretation result and the interpretation result is output. In a case where the logical page to be processed includes an element to be cached, a cache reference command including cache identification information that is generated from data of the element to be cached in accordance with a predetermined generation rule is generated without the element to be cached being interpreted, and the generated cache reference command is incorporated into the interpretation result of the logical page to be processed as an interpretation result of the element to be cached. The dual interpretation unit has the first page processing mode and a cache mode. The cache mode is a mode in which, in response to detection of an element to be cached for which an interpretation result has not been stored in the cache memory, the detected element to be cached is interpreted to obtain an interpretation result and the interpretation result is stored in the cache memory in association with cache identification information that is generated from data of the element to be cached in accordance with the generation rule. The plural logical page interpretation units and the dual interpretation unit operate in the first page processing mode in a case where the amount of progress of interpretation of the print data is less than or equal to a predetermined threshold value. The plural logical page interpretation units operate in the second page processing mode and the dual interpretation unit operates in the cache mode in a case where the amount of progress of interpretation of the print data is greater than the threshold value.

BRIEF DESCRIPTION OF THE DRAWINGS

Exemplary embodiments of the present invention will be described in detail based on the following figures, wherein:

FIG. 17 illustrates an example of the content of data in a cache table;

FIG. 20 illustrates another example of the content of data in the cache table;

DETAILED DESCRIPTION

Hardware Configuration of System

Figure 1:
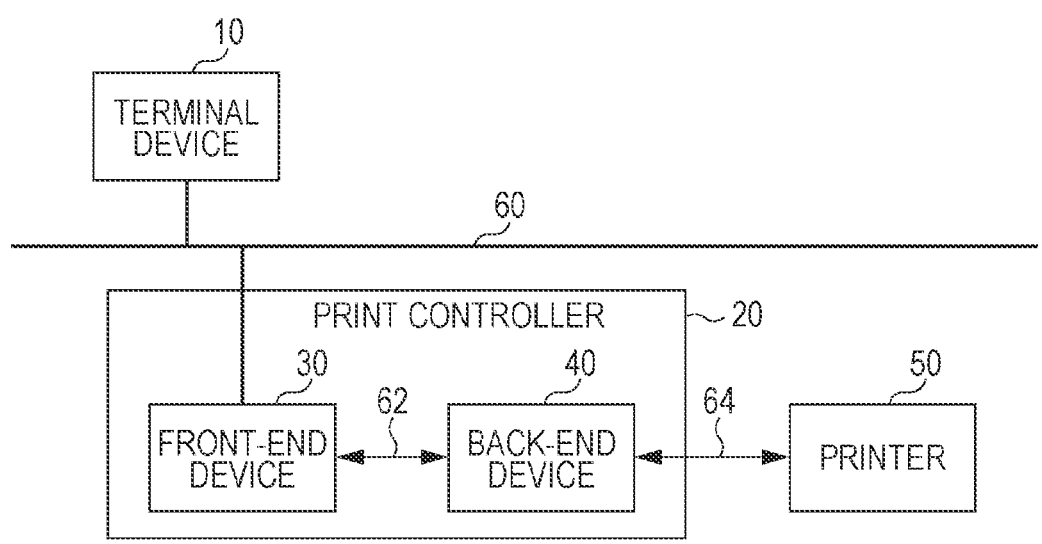
FIG. 1 is a block diagram illustrating an example of a configuration of an image processing system.

FIG. 1 is a block diagram illustrating an example of a configuration of an image processing system. Image processing systems according to examples of the following exemplary embodiments of the present invention and their exemplary modifications may have a configuration illustrated by way of example in FIG. 1. The system in the example illustrated in FIG. 1 includes a terminal device 10, a print controller 20, and a printer 50. The print controller 20 includes a front-end device 30 and a back-end device 40. The terminal device 10 is connected to the front-end device 30 via a communication unit 60, and transmits a print job including a document print instruction to the front-end device 30 in accordance with a user instruction. The front-end device 30 is connected to the back-end device 40 via a communication unit 62, and the back-end device 40 is connected to the printer 50 via a communication unit 64.

The communication units 60, 62, and 64 may be networks such as local area networks (LANs). The communication units 60, 62, and 64 may be common communication units or different communication units. For example, the communication unit 60, which connects the terminal device 10 and the front-end device 30, may be a LAN, and the communication unit 62, which connects the front-end device 30 and the back-end device 40, and the communication unit 64, which connects the back-end device 40 and the printer 50, may be dedicated communication units different from a LAN.

In the system in the example illustrated in FIG. 1, a print job transmitted from the terminal device 10 is processed by the front-end device 30, and data obtained as a result of the processing is passed to the back-end device 40. The back-end device 40 generates rendering data (also referred to as "raster data"), and the printer 50 performs printing in accordance with the generated rendering data.

In the example illustrated in FIG. 1, the terminal device 10, the front-end device 30, and the back-end device 40 may be implemented by, for example, a general-purpose computer. The computer has a circuit configuration in which hardware components such as a central processing unit (CPU), a memory (primary memory), various input/output (I/O) interfaces, and a communication interface are connected via a bus. The computer exchanges data with other devices via the communication interface. An input device including a keyboard and a mouse, and a display such as a cathode ray tube (CRT) display or a liquid crystal display are further connected to the bus via, for example, I/O interfaces. A disk drive for reading a hard disk drive (HDD) and portable non-volatile recording media compatible with various standards, such as a compact disc (CD), a digital versatile disc (DVD), and a flash memory, is further connected to the bus via an I/O interface. Such a drive functions as an external memory with respective to the memory. Programs describing the content of processes in the following exemplary embodiments and their exemplary modifications are stored in a permanent memory such as the HDD via a recording medium such as a CD or a DVD or via a network, and are installed into the computer. The programs stored in the permanent memory are read into the memory and are executed by the CPU, thereby allowing the processes in the following exemplary embodiments and their exemplary modifications to be implemented.

In examples of the following exemplary embodiments and their exemplary modifications, some of the functions of the back-end device 40 may be implemented by hardware processing rather than software processing in response to the execution of a program. The hardware processing may be performed using, for example, a processor capable of dynamically reconfiguring a circuit during the execution of the processing, called a dynamic reconfigurable processor (DRP). Alternatively, the hardware processing may be performed using a circuit such as an application specific integrated circuit (ASIC). For example, a hardware element that executes some of the functions of the back-end device 40, such as a DRP or an ASIC, may be configured in advance, and may be connected to a bus of a general-purpose computer, thereby implementing the back-end device 40.

As a specific example of hardware implementing the front-end device 30 and the back-end device 40, a blade server in which multiple information processing devices each functioning as a server are housed in a single housing may be used.

The blade server is a server device in which multiple substrates (or blades) each having mounted thereon a general-purpose computer including a CPU and a memory are housed in a housing. For example, one of the blades included in the blade server may function as the front-end device 30, and another blade may function as the back-end device 40. Alternatively, for example, each of the front-end device 30 and the back-end device 40 may be implemented by multiple blades included in the blade server.

The printer 50 is a device that performs printing on media such as sheets of paper, and may be, for example, a continuous-feed printer. Examples of the following exemplary embodiments and their exemplary modifications will be described in the context of the printer 50 being a continuous-feed printer, by way of example. The printer 50 may be configured to perform electrophotographic printing, inkjet printing, or printing using any other type of print engine.

Exemplary Embodiments

Figure 2:
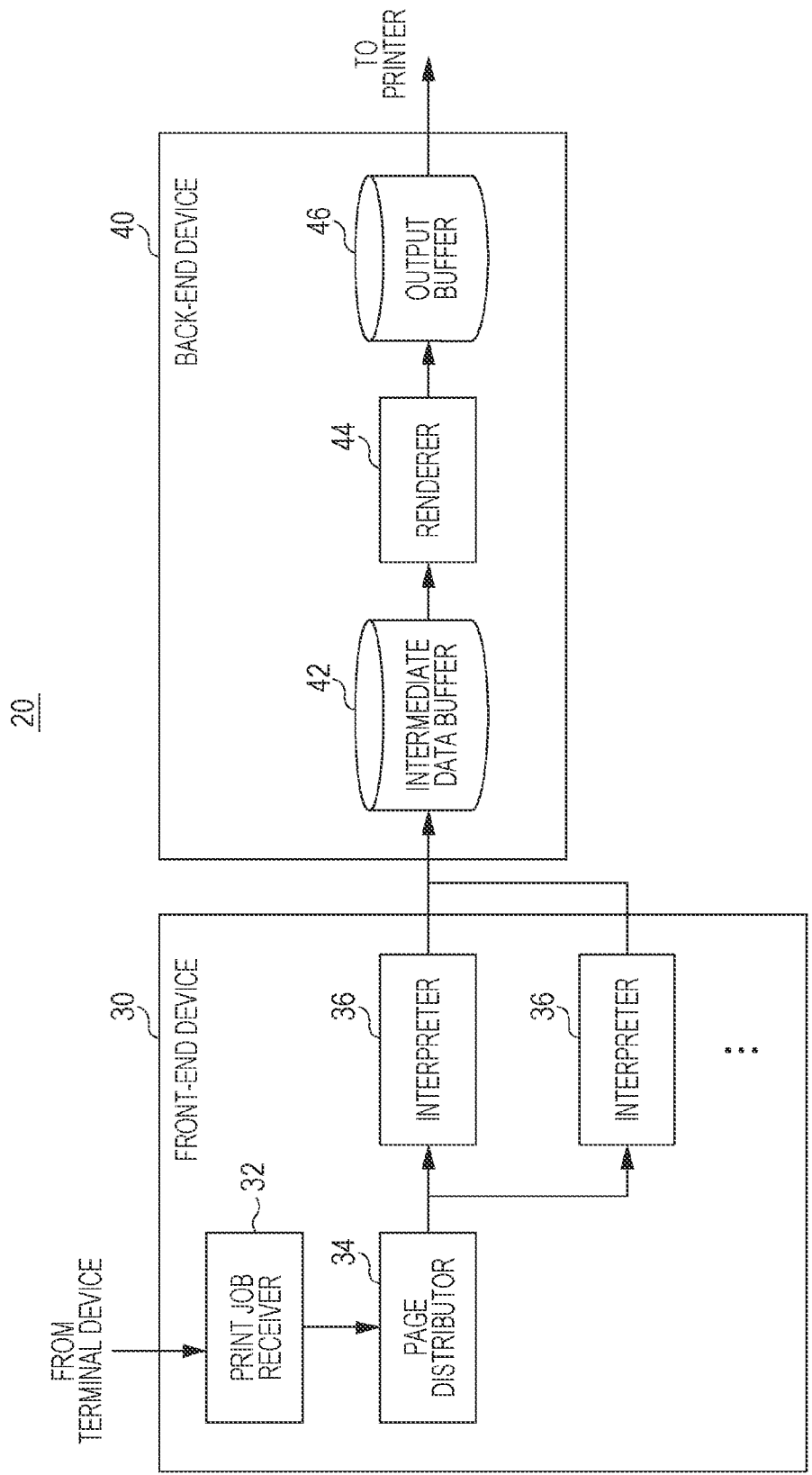
FIG. 2 is a block diagram illustrating an example of an internal configuration of a print controller according to an exemplary embodiment.

FIG. 2 illustrates an example of a functional configuration of the front-end device 30 and the back-end device 40 of the print controller 20. The front-end device 30 includes a print job receiver 32, a page distributor 34, and multiple interpreters 36. The back-end device 40 includes an intermediate data buffer 42, a renderer 44, and an output buffer 46.

The print job receiver 32 of the front-end device 30 receives a print job from the terminal device 10. In an example of this exemplary embodiment, a print job includes an instruction to print a document, and data of the document to be printed, which is written in a page description language. A page description language (PDL) is a computer programming language for causing an information processing device to execute processes such as a displaying process and a printing process. Examples of the page description language include PostScript (registered trademark) and Portable Document Format (PDF). Data written in a page description language includes position information, format information, color information, and so forth on objects included in a document to be printed, such as text, drawings, and images (bitmap images). In the following description, data of a document to be printed, which is written in a page description language, is referred to as "PDL data". The print job receiver 32 passes PDL data included in the received print job to the page distributor 34.

The page distributor 34 determines which of the pages included in the PDL data acquired from the print job receiver 32 is to be processed and by which of the interpreters 36 it is to be processed. The term "page", as used herein, denotes a page specified in PDL data, that is, a logical page. One or plural logical pages are printed on one side of a sheet, or on one physical page, in accordance with print settings. In the following description, as may be apparent from the context and unless otherwise stated, the term "page" refers to a logical page.

The page distributor 34 assigns a page to each of the interpreters 36 in accordance with the operation states of the individual interpreters 36. The page distributor 34 places a high priority on, for example, an interpreter 36 that is not executing a process or an interpreter 36 that is executing a process with a lower load than the other interpreters 36, and assigns pages to the interpreters 36 in order, starting from the first page in the PDL data. The page distributor 34 notifies each of the interpreters 36 of the assigned page, and also passes the PDL data acquired from the print job receiver 32 to the interpreters 36. In the illustrated example, not only the assigned pages in the PDL data but also the entire PDL data is passed to the interpreters 36. In this example, for example, a page-dependent PDL (that is, a PDL of a type in which the generation of an image of a page depends on the results of interpretation of PDL data previous to the page) is used. In another example, a page-independent PDL (a PDL of a type in which only PDL data of an individual page is used for accurate generation of an image of the page) may be used. In this case, the page distributor 34 may assign a page of PDL data to each of the interpreters 36, and pass portions into which the PDL is divided by page to the associated interpreters 36 in accordance with the assignment.

Each of the interpreters 36 interprets the PDL data acquired from the page distributor 34, and generates and outputs, for the assigned page notified by the page distributor 34, intermediate data including instructions on the procedure for generating rendering data.

More specifically, each of the interpreters 36 interprets the PDL data, and generates intermediate data for the assigned page. The intermediate data is data in a stage before it is eventually converted into data to be output to the printer 50. Examples of the intermediate data include a display list and a section data format (see, for example, Japanese Unexamined Patent Application Publication No. 2011-150535 filed by the present applicant). Here, each of the interpreters 36 may generate intermediate data separated into plates by fundamental colors (for example, four colors of yellow (Y), magenta (M), cyan (C), and black (K)) used in the printing operation performed by the printer 50. However, this is merely an example.

The intermediate data includes rendering instructions representing, for each of objects that are elements forming a document to be printed, a procedure for rendering the object in a print image of the document. The rendering instructions may be written in a language that allows the representation of a more detailed procedure than a page description language. For example, if information indicating the position, shape, and size of a certain object in a print image is defined in a page description language, in an intermediate data representation of rendering instructions for the object, a procedure for rendering the object may be written in units of scanning lines in the print image. The back-end device 40, described below, generates rendering data to be output to the printer 50 in accordance with the intermediate data.

Following are examples of commands used in the section data format (also referred to as the "run list" format).

(1) line, ym, xl, xr, c

Perform rendering with gradation c from the x coordinate xl to the x coordinate xr-1 in the scanning line at the y coordinate ym.

(2) duplicate

Perform rendering in the same manner (x coordinates, gradation) as that in the scanning line for the previous rendering.

(3) window, xl, xr

Perform rendering from the x coordinate xl to the x coordinate xr-1 with the same gradation as that in the scanning line for the previous rendering.

Intermediate data of a certain page may be regarded as a set of instructions representing a procedure for rending each of objects included in the page. The amount of intermediate data for one page is smaller than the amount of raster data including the values of the pixels included in the page.

The section data format is merely an example of the intermediate data format. This exemplary embodiment may be applied to any intermediate data format to be used. In a case where a back-end device generates rendering data by performing hardware processing, any intermediate data format representing a rendering procedure that makes it possible to generate rendering data using hardware processing may be used, and a different format from the section data format given above by way of example may be used.

Intermediate data generated by each of the interpreters 36 is output to the back-end device 40. The output intermediate data is written in the intermediate data buffer 42 of the back-end device 40. The renderer 44 reads intermediate data of each of the pages stored in the intermediate data buffer 42, and generates rendering data (raster data) in accordance with the read intermediate data of the page. The generated rendering data of the respective pages is stored in the output buffer 46, and is sequentially read from the printer 50. The printer 50 prints the rendering data of the respective pages read from the output buffer 46 on a sheet of paper.

Figure 3:
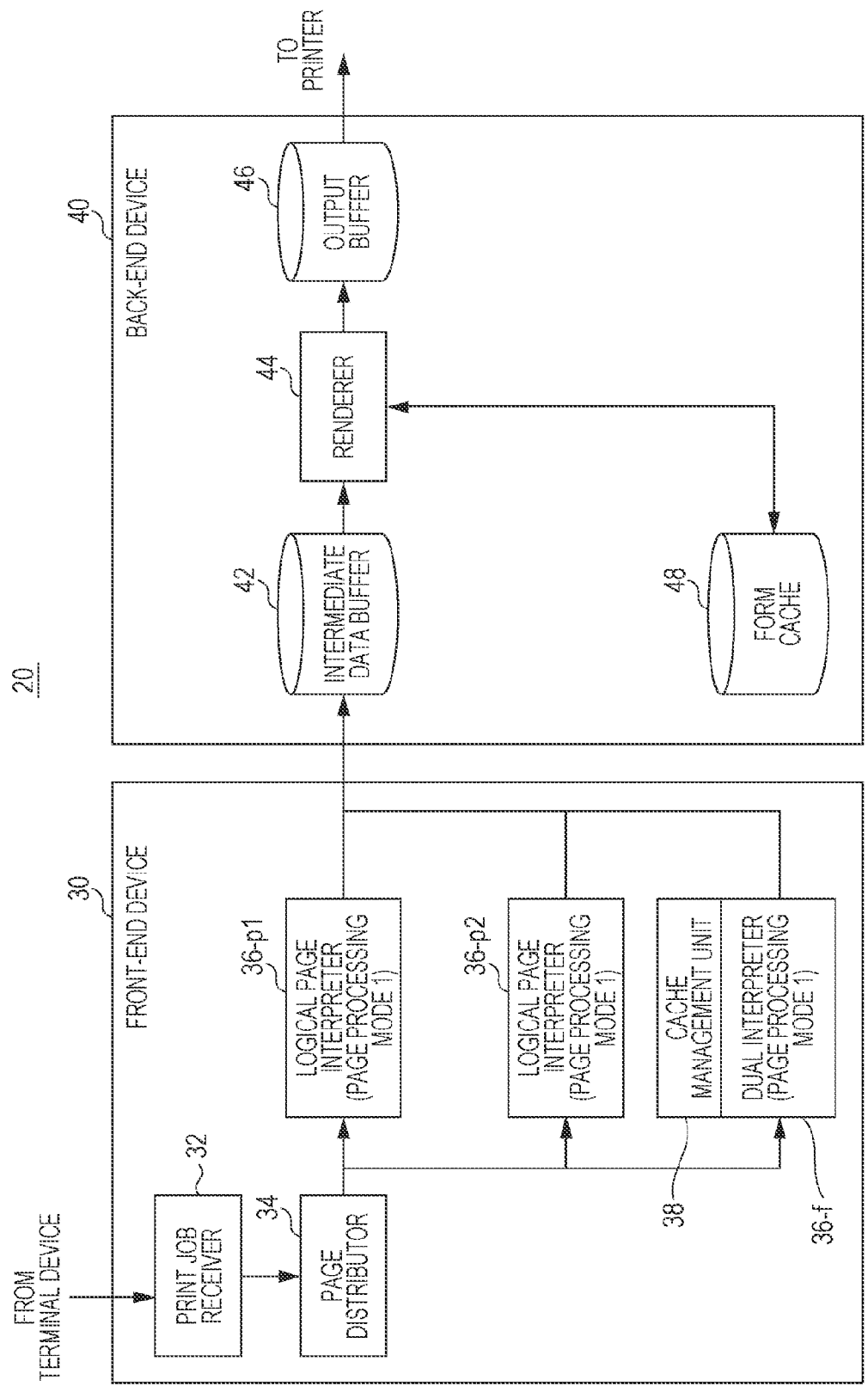
FIG. 3 is a block diagram illustrating an example of an internal configuration of a print controller according to an exemplary embodiment in an "initial period" stage.
Figure 4:
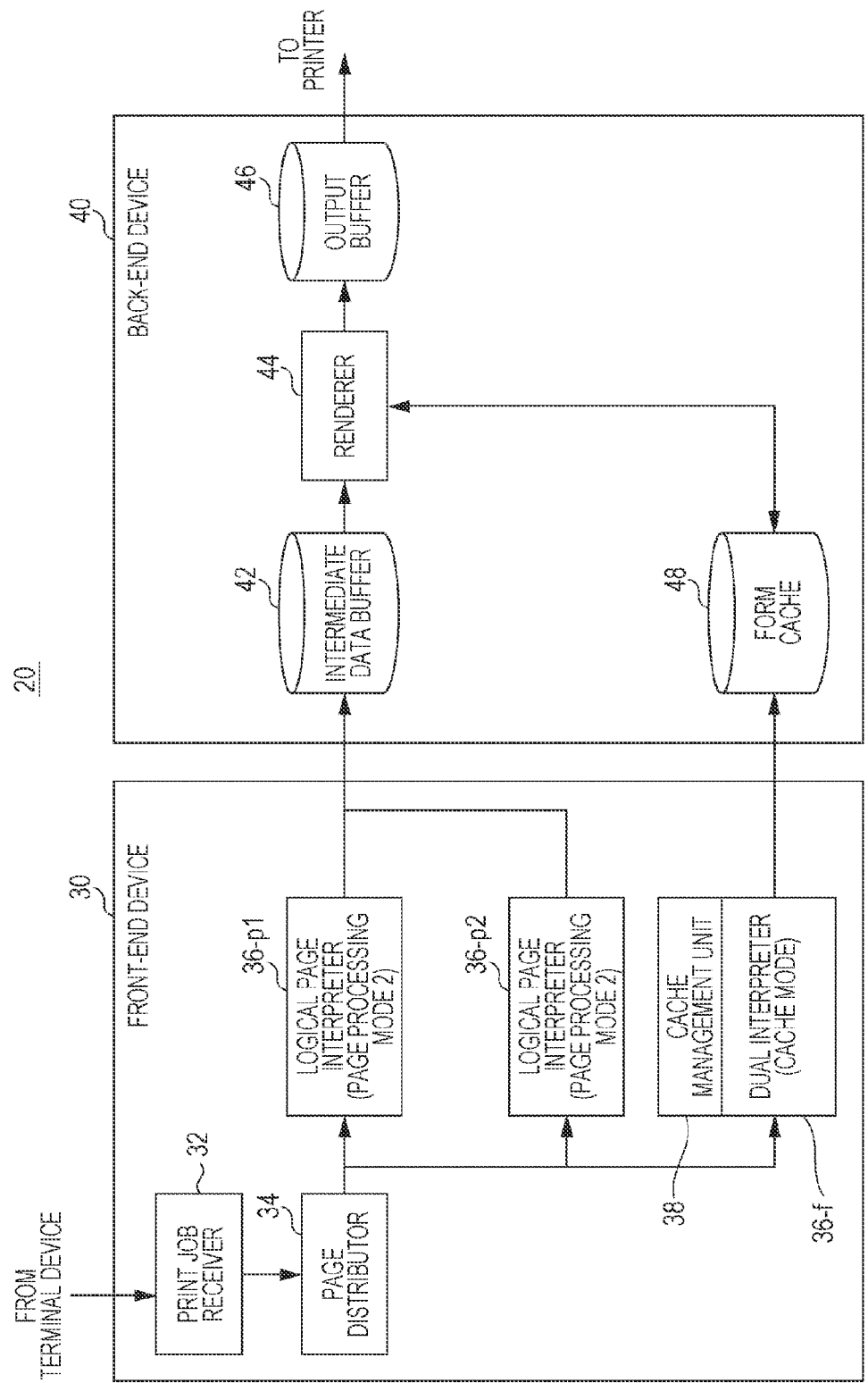
FIG. 4 is a block diagram illustrating an example of an internal configuration of the print controller according to the exemplary embodiment in a "normal period" stage.

Next, a configuration of the print controller 20 according to an exemplary embodiment will be described with reference to FIGS. 3 and 4. In this exemplary embodiment, the print controller 20, particularly, the front-end device 30, is configured to change the internal operation mode between an "initial period" and a "normal period". FIG. 3 illustrates the configuration of the print controller 20 during the "initial period", and FIG. 4 illustrates the configuration of the print controller 20 during the "normal period". The configurations illustrated in FIGS. 3 and 4 differ in function but do not differ in hardware configuration. The term "initial period" refers to a period from the start of a print job to the completion of processing of a predetermined amount (for example, a predetermined number of pages) of PDL data by the front-end device 30. The term "normal period" refers to a period subsequent to the "initial period". The "initial period" and the "normal period" will be described in more detail below.

In the configuration illustrated by way of example in FIG. 2, the front-end device 30 includes multiple interpreters 36, and the multiple interpreters 36 execute in parallel a process for interpreting the respectively assigned pages and generating intermediate data. In the configurations according to the exemplary embodiment illustrated in FIGS. 3 and 4, in contrast, the front-end device 30 includes two logical page interpreters 36-*p*1 and 36-*p*2 (hereinafter collectively referred to as "logical page interpreters 36-*p*" unless they are individually identified), and a single dual interpreter 36-*f*. Like the interpreters 36 illustrated in FIG. 2, the logical page interpreters 36-*p* serve to interpret pages (logical pages) and generate intermediate data. The dual interpreter 36-*f* has an operation mode in which logical pages are interpreted and intermediate data is generated ("page processing mode 1" described below), and an operation mode in which only forms in logical pages are interpreted and intermediate data is generated ("cache mode" described below). The dual interpreter 36-*f* operates in the desired operation mode according to the situation. While the example illustrated in FIG. 3 uses two logical page interpreters 36-*p*, more than two logical page interpreters 36-*p* may be used.

The term "form" refers to an image that is expected to be repeatedly used over plural pages. A form includes one or more objects. In PDL data, a form is generally assigned identification information (referred to as a "form ID") uniquely identifying the form in the PDL data. If PDL data includes commands that specify the same form ID, the commands represent images that use the same form.

In this exemplary embodiment, a framework (a form cache 48) that caches and recycles intermediate data of a form that is generated may prevent inefficient generation of intermediate data such that intermediate data of the same form is generated a number of times. The form cache 48 is a cache for temporarily storing intermediate data of a form to be cached.

Each of the logical page interpreters 36-*p*1 and 36-*p*2 interprets PDL data of a page assigned thereto by the page distributor 34 to generate intermediate data. Each of the logical page interpreters 36-*p* has the following two operation modes: "page processing mode 1" and "page processing mode 2". The page processing mode 1 is a mode in which all objects in an assigned page are interpreted regardless of whether each of the objects is a form or not and intermediate data of the page is generated. The page processing mode 2 is a mode in which only objects other than a form in an assigned page are interpreted. In the page processing mode 2, for the form included in the page, intermediate data of a group of PDL commands (objects) forming the form is replaced by an intermediate data command for referring to identification information (referred to as a "cache ID") identifying intermediate data of the form, which is cached in the form cache 48. The intermediate data of the respective pages generated by the logical page interpreters 36-*p* is sent to the intermediate data buffer 42 of the back-end device 40.

The logical page interpreters 36-*p* operate in the page processing mode 1 during the "initial period" (FIG. 3), and are switched to the page processing mode 2 in response to a transition to the "normal period" (FIG. 4).

During the "initial period", the dual interpreter 36-*f* operates in the page processing mode 1, and creates intermediate data of an assigned page in a manner similar to the logical page interpreters 36-*p*. In response to a transition to the "normal period", the dual interpreter 36-*f* enters the cache mode, and creates intermediate data of a form. In the cache mode, the dual interpreter 36-*f* interprets a group of PDL commands of the form in the PDL data, and generates intermediate data representing the form. The generated intermediate data of the form is registered in the form cache 48 of the back-end device 40. The dual interpreter 36-*f* assigns at least a cache ID that is unique in the print job to the intermediate data representing the form to be registered in the form cache 48, and registers the intermediate data in the form cache 48 in association with the cache ID.

The logical page interpreters 36-*p* process only pages assigned thereto by the page distributor 34 in the PDL data of the print job (or interprets and generates intermediate data) regardless of the page processing mode 1 or the page processing mode 2. The dual interpreter 36-*f*, in contrast, processes only a page assigned thereto by the page distributor 34 in the page processing mode 1 in a manner similar to the logical page interpreters 36-*p*, and processes all the pages (except the pages processed during the "initial period") in the PDL data of the print job in the cache mode. It is to be noted that in the cache mode, the dual interpreter 36-*f* processes only a form in the pages, and does not process general objects that are not included in the form.

The logical page interpreters 36-*p*1 and 36-*p*2 and the dual interpreter 36-*f* are typically implemented as processes executed on a CPU. For example, in a system configuration including a multi-core CPU, an individual core may be configured to execute a process of a single interpreter 36. In the following description, the logical page interpreters 36-*p*1 and 36-*p*2 and the dual interpreter 36-*f* are collectively referred to as "interpreters 36".

A cache management unit 38 holds management information for cache data (that is, intermediate data of a form) held in the form cache 48. The cache management unit 38 stores, for each piece of cache data, a cache ID and information (for example, the combination of the top address and the data size) indicating the storage location of the cache data in a memory space of the form cache 48. When processing a form in PDL data in the cache mode, the dual interpreter 36-*f* refers to the cache management unit 38 and determines whether cache data of the form has been registered in the form cache 48 or not. If the cache data of the form has been registered, the dual interpreter 36-*f* does not generate cache data of the form. The dual interpreter 36-*f* generates cache data of the form only in a case where the cache data has not been registered.

The renderer 44 of the back-end device 40 reads intermediate data of the respective pages stored in the intermediate data buffer 42 in, for example, page order, and generates rendering data in accordance with commands for the read intermediate data of the respective pages. If the read intermediate data of the respective pages includes a command for referring to a cache ID, the renderer 44 reads the intermediate data corresponding to the cache ID (that is, the intermediate data of a form) from the form cache 48, and processes the read intermediate data to generate rendering data of the form. The generated rendering data is combined with the rendering data of the pages.

In the foregoing description, for simplicity of description, the dual interpreter 36-*f* caches any kind of form during the "normal period", or in the "cache mode". In an actual apparatus, however, all kinds of forms are not necessarily cached. The use of a cache may cause processing overhead such as registration in the cache and queries of the presence or absence of necessary cache data. A form that is small or is simple in structure may require a short period of time for the generation of intermediate data. Taking such processing overhead into account, processing may be accelerated without using a cache. In this exemplary embodiment, therefore, only a form to be cached to achieve higher processing efficiency is cached. To this end, in this exemplary embodiment, rules for discriminating a form to be cached to achieve higher processing efficiency (referred to as a "form to be cached") from an otherwise form are defined. Examples of the rules for discrimination are given below.

(Rule 1) If the number of pixels in the bounding box of a form is larger than a predetermined value (referred to as the "threshold number of pixels"), the form is determined to be a form to be cached, and otherwise the form is determined not to be a form to be cached. The bounding box of a form is a minimum rectangular volume that allows the form to be surrounded in a physical page.

(Rule 2) If the number of objects contained in a form is larger than a predetermined value (referred to as the "threshold number of objects"), the form is determined to be a form to be cached, and otherwise the form is determined not to be a form to be cached.

(Rule 3) If a form includes an image (bitmap) whose size is larger than a predetermined size (referred to as the "threshold image size"), the form is determined to be a form to be cached, and otherwise the form is determined not to be a form to be cached.

The determination may be performed using, for example, any one of Rules 1 to 3 described above by way of example, or using two or more of them in combination. In a case where the determination is performed using two or more rules in combination, a form determined to be a "form to be cached" in accordance with at least one of the rules may be determined to be a form to be cached regardless of the results of determination in accordance with the other rule or rules.

The threshold number of pixels, the threshold number of objects, and the threshold image size described above are values determined in accordance with the system configuration or performance of the front-end device 30 or the back-end device 40, and may be determined by experiment, simulation, or the like.

In this exemplary embodiment, the logical page interpreters 36-*p*1 and 36-*p*2 and the dual interpreter 36-*f* determine whether a form is a form to be cached, by using a uniform common determination rule. Therefore, a form determined by, for example, the logical page interpreter 36-*p*1 to be a form to be cached is also determined by the logical page interpreter 36-*p*2 and the dual interpreter 36-*f* to be a form to be cached.

In this exemplary embodiment, furthermore, the logical page interpreters 36-*p*1 and 36-*p*2 and the dual interpreter 36-*f* assign a cache ID to cache data (intermediate data) of a form using a uniform, common ID assignment rule. In the common ID assignment rule, a cache ID to be assigned to cache data of a form is determined by taking into account various parameters defining the state of a finally rendered image of the form in addition to a form ID assigned to the form in the PDL data. Even when forms having the same form ID are used, difference in parameters with which the forms are to be rendered and printed results in finally different images of the forms appearing on printed matter. For this reason, pieces of cache data of forms having different parameters are handled as being different. Examples of parameters for rendering and the like which define cache IDs include a coordinate transformation matrix (a matrix representing the angle of rotation around coordinates and the ratio of scaling), rendering attribute information (for example, line width, line cap, line join, miter limit, line shape, stroke settings, rendering method, logical operation mode, and pattern information), clip information, and color information. In an example, the combination of a form ID and the parameters described above is represented as binary data, and a cache ID is generated from the generated binary data using a hash function such as MD5 hash function (defined in rfc 1321). A form ID and the parameters described above, which are used as materials of a cache ID, are referred to as "keyword data".

More exactly, the method described above may cause the cache IDs (hash values) of different pieces of cache data to have the same value due to the collision of hash functions. In order to avoid collision of hashes, the keyword data may be used as a cache ID.

Since keyword data is considerably long, a certain period of time may be required to match one piece of keyword data against another in order to determine whether there is available cache data. A considerable period of time may be taken to check a piece of keyword data against the corresponding piece of keyword data for every cache entry in the cache management unit 38. In the following example, therefore, the combination of keyword data and the hash value of the keyword data is used as a cache ID. In this example, the presence or absence of available cache data is determined by, first, narrowing down the cache entries for which a piece of keyword data is matched against the corresponding pieces of keyword data by hash value to reduce the number of cache entries.

In this exemplary embodiment, accordingly, the logical page interpreters 36-*p*1 and 36-*p*2 and the dual interpreter 36-*f* use a common ID assignment rule. Thus, for example, when the logical page interpreter 36-*p*1 generates a certain cache ID for a certain form (where the logical page interpreter 36-*p*1 does not generate intermediate data of the form), the dual interpreter 36-*f* generates the same cache ID, and registers the intermediate data of the generated form in the form cache 48 in association with the cache ID.

In the "initial period" or initial stage illustrated in FIG. 3, the dual interpreter 36-*f* interprets a page in parallel along with the logical page interpreters 36-*p*1 and 36-*p*2, and outputs the interpretation result to the intermediate data buffer 42. In this stage, the dual interpreter 36-*f* does not register intermediate data of a form in the form cache 48, and thus the form cache 48 is not used. The renderer 44 processes intermediate data of each of the pages (including intermediate data of forms and intermediate data of objects other than the forms) existing in the intermediate data buffer 42, and generates intermediate data of these pages.

In the "normal period" or normal stage illustrated in FIG. 4, the logical page interpreters 36-*p*1 and 36-*p*2 interpret pages in parallel. In this stage, the dual interpreter 36-*f* does not join the parallel interpretation of pages but processes only a form to generate intermediate data of the form, and registers the generated intermediate data in the form cache 48. In response to the detection of a command for referring to the cache while the renderer 44 processes the intermediate data of each of the pages existing in the intermediate data buffer 42, the renderer 44 acquires cache data specified by the command from the form cache 48 for use.

Next, a more detailed description will be given of the transition from the "initial period" to the "normal period". As described above, the "initial period" is a period from the start of a print job to the completion of processing of a predetermined amount of PDL data by the front-end device 30. The threshold that triggers a transition from the "initial period" to the "normal period", that is, the "predetermined amount" described above, is defined as, for example, the number of logical pages. For example, the period corresponding to the first to n-th pages (n is a predetermined integer more than one) in the print job may be the "initial period", and the period after the completion of the processing (interpretation) of pages up to the n-th page may be the "normal period".

Here, for example, the value n may be defined as follows: n="the number of logical page interpreters 36-*p* and dual interpreters 36-*f*". In the period during which the first several pages in a print job, the number of which is equal to the "number of logical page interpreters 36-*p* and dual interpreters 36-*f*", are processed, making the dual interpreter 36-*f* join the parallel interpretation of pages in the manner illustrated in FIG. 3 may provide higher processing efficiency than making the dual interpreter 36-*f* be used exclusively for the creation of cache data of forms in the manner illustrated in FIG. 4.

For example, the number of logical page interpreters 36-*p* is three, and the dual interpreter 36-*f* is used exclusively for the generation of cache data of forms from the beginning of a print job. In this case, the first three pages in the print job, that is, the first to third pages, are processed in parallel by the three logical page interpreters 36-*p*. If the processing loads of these three pages are equal, the generation of intermediate data of the three pages is substantially simultaneously completed, and the generated intermediate data is sent to the back-end device 40. If the dual interpreter 36-*f* is used for the creation of cache data of forms from the beginning of the print job, the following difficulties may arise. The dual interpreter 36-*f* sequentially generates cache data of forms, starting from the first page. If a form appears the first time in the third page, the generation of cache data of the form will be completed and the generated cache data will be sent to the back-end device 40 after passage of a certain amount of time since the start of the processing of the print job. Thus, when the renderer 44 attempts to process later pages among the three pages that undergo parallel processing, the completion of generation of cache data of forms used in such pages (particularly, the third page) might be delayed. This problem is particularly serious in the case of the third page.

Such delay of the completion of generation of cache data of a form in the third page may be addressed by causing the three logical page interpreters 36-*p* and the dual interpreter 36-*f* to process pages in parallel at the beginning of the print job so that these interpreters 36 generate intermediate data without using cache data of a form.

In addition, if the dual interpreter 36-*f* is used exclusively for the processing of forms from the beginning of a print job, three out of the four interpreters 36 join the parallel processing of pages. In this case, the fourth page is processed by one of the three logical page interpreters 36-*p* that has first completed the processing the assigned page. This logical page interpreter 36-*p* processes the fourth page in the second round of processing, and a considerable amount of time is taken until the processing of the fourth page is completed.

Figure 5:
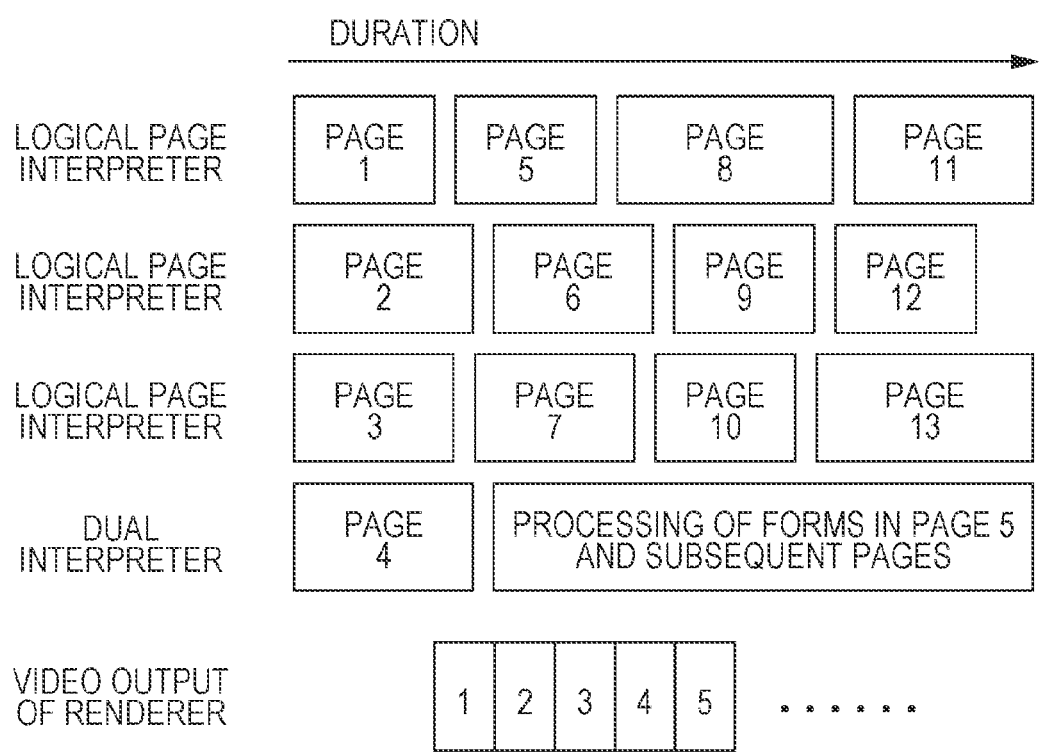
FIG. 5 illustrates an example of the progress of pages being processed by an apparatus including four interpreters, in response to a transition from the "initial period" to the "normal period" when the processing of a number of pages equal to the number of interpreters (that is, four pages) from the first page in a print job is completed.

In contrast, as illustrated in FIG. 5, making the dual interpreter 36-*f* join the parallel processing of pages at the beginning of the print job may allow the fourth page to be processed by the dual interpreter 36-*f* at the same time as the first to third pages processed by the other three logical page interpreters 36-*p*. As a result, the interpretation result of the fourth page may be obtained faster than in the case where the dual interpreter 36-*f* is used exclusively for the processing of forms at the beginning of the print job.

In addition, as illustrated by way of example in FIG. 5, the renderer 44 does not initiate processing until the generation of intermediate data of the first page is completed. A certain amount of time may be required for the renderer 44 to process the first to fourth pages (the "VIDEO OUTPUT OF RENDERER" in the bottom row of FIG. 5). The logical page interpreters 36-*p* are configured to continuously process pages in the second round before the renderer 44 completes the processing of pages up to the fourth page. Thus, even if the dual interpreter 36-*f* does not join the parallel processing of pages and serves to generate cache data of forms, there may occur no marked reduction in processing speed as in the first round.

In this exemplary embodiment, accordingly, during the "initial period" corresponding to the first to n-th page (n="the number of logical page interpreters 36-*p* and dual interpreters 36-*f*") in a print job, the logical page interpreters 36-*p* and the dual interpreter 36-*f* operate in the page processing mode 1 to process pages in parallel. After the progress of interpretation of the print job by the front-end device 30 has reached the (n+1)-th page, the dual interpreter 36-*f* is used exclusively for the generation of cache data. This may provide high-speed processing while preventing redundant interpretation of the same form even if the logical page interpreters 36-*p* continuously perform processing without checking the state of the form cache 48.

In the foregoing description, the total number of interpreters 36 included in the front-end device 30 is used as a typical example of the threshold number of pages n by which the "initial period" and the "normal period" are identified. However, the value n is not limited to this example. The value n may also be determined by, for example, experiment or the like.

Next, an example of a processing procedure of the page distributor 34 will be described with reference to FIG. 6. In the illustrated example, when the processing of a print job is started, the page distributor 34 activates the interpreters 36 (that is, the logical page interpreters 36-*p* and the dual interpreter 36-*f*) to operate in the page processing mode 1 (S1002). At the start of the print job, the front-end device 30 is in the "initial" stage, during which the logical page interpreters 36-*p* and the dual interpreter 36-*f* operate in the page processing mode 1 and process different pages (parallel processing). Then, the page distributor 34 determines whether the conditions for a transition to the normal period (for example, "the processing of pages up to the n-th page has been completed") are met (S1004). At the start of the print job, this determination result is negative (NO). Then, the process proceeds to S1010.

In S1010, the page distributor 34 assigns a page to each of the interpreters 36. In S1010, first, the page distributor 34 determines whether there is an available interpreter 36 (that is, an interpreter 36 that is not processing a page) (S1012). If an available interpreter 36 is found, the page distributor 34 requests the found interpreter 36 to process the initial page among unprocessed pages in the print data (S1014). In the "initial" stage, in S1014, the page distributor 34 sequentially assigns different pages to the logical page interpreters 36-$p$ and the dual interpreter 36-$f$ so that the logical page interpreters 36-$p$ and the dual interpreter 36-$f$ process the different pages in parallel. In the "normal" stage, in contrast, in S1014, the page distributor 34 sequentially assigns different pages to the logical page interpreters 36-$p$ so that the logical page interpreters 36-$p$ perform parallel processing, and sequentially assigns all the pages in the print data, except the pages that have been processed in the "initial" stage, to the dual interpreter 36-$f$ each time the processing of one page is completed.

After a single page is assigned to an available interpreter 36, the page distributor 34 determines whether the interpretation of all the pages in the print job has been completed (S1020). If the determination result is positive (YES), the page distributor 34 proceeds to S1022, and terminates the operation of the interpreters 36. If the determination result is negative (NO), the page distributor 34 returns to S1004.

For example, if the process of S1010 is repeatedly performed on the first to n-th pages (n is a threshold value that triggers a transition from the "initial period" to the "normal period") in the print job, the determination result of S1004 is positive (YES). In this case, the page distributor 34 determines whether a transition to the "normal period" has occurred (S1006). If the transition has not occurred, the page distributor 34 instructs the individual interpreters 36 to switch their operation modes to the modes for the "normal period" (S1008). That is, the logical page interpreters 36-$p$ switch their operation modes to the page processing mode 2, and the dual interpreter 36-$f$ switches its operation mode to the cache mode. Accordingly, the dual interpreter 36-$f$ is used exclusively for the creation of cache data of a form, and the processing of pages is handled by the two logical page interpreters 36-$p$. Then, the page distributor 34 proceeds to S1010. If the determination result of S1006 is positive (YES: the transition has occurred), the page distributor 34 skips the process of S1008, and proceeds to S1010.

Next, referring to FIGS. 7 to 10, there is illustrated, by way of example, the procedure of processes executed by the logical page interpreters 36-$p$ and the dual interpreter 36-$f$.

Figure 7:
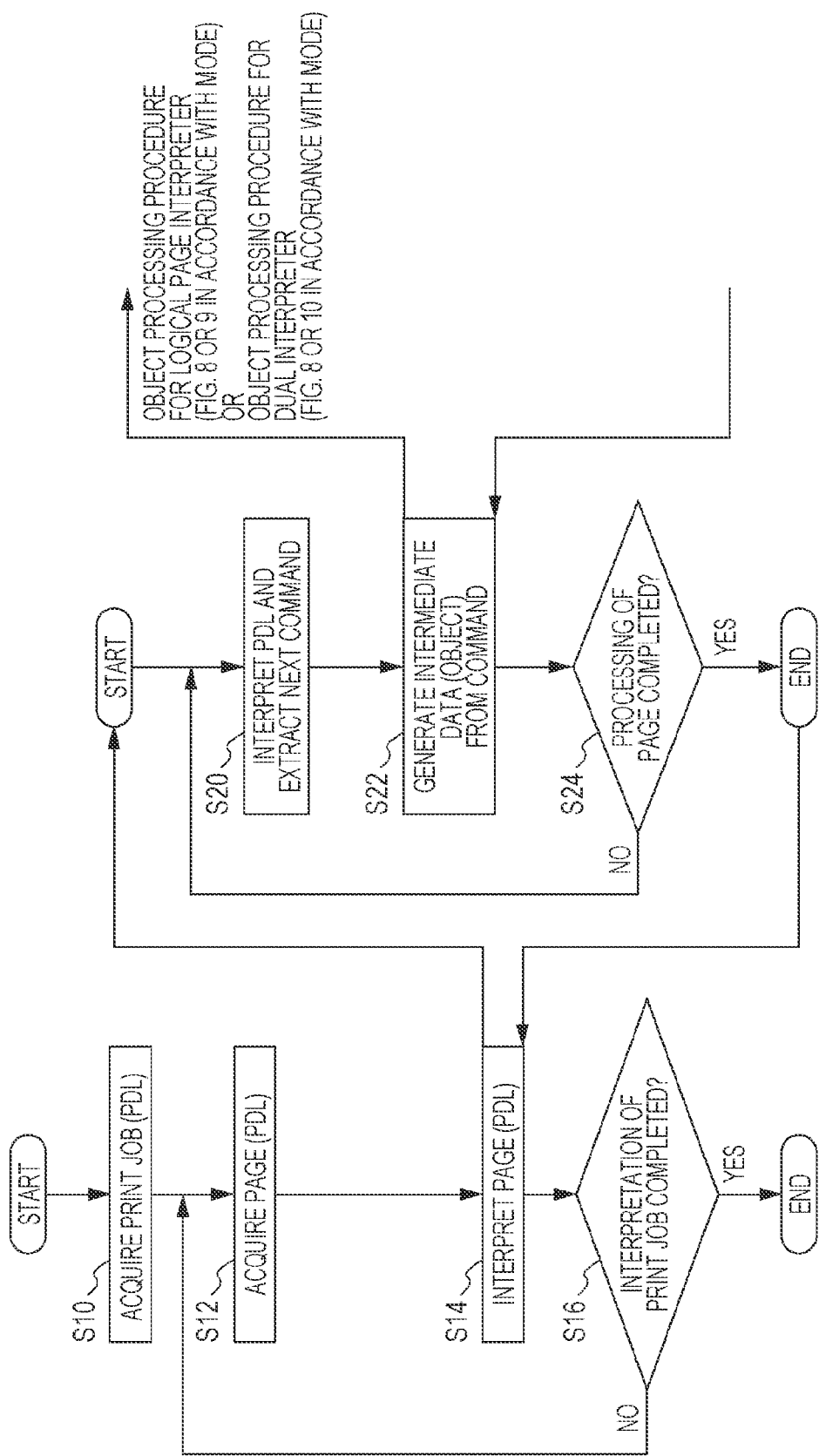
FIG. 7 illustrates an example of an overall processing procedure for a logical page interpreter and a dual interpreter.

FIG. 7 illustrates a processing procedure common to the logical page interpreters 36-$p$ and the dual interpreter 36-$f$. In the illustrated example, PDL data written in a page-dependent PDL is processed. In the illustration in FIG. 7, the logical page interpreters 36-$p$ and the dual interpreter 36-$f$ are collectively referred to as "interpreters 36". The individual interpreters 36 operate independently and asynchronously.

In the illustrated procedure, an individual interpreter 36 acquires the overall PDL data of a print job from the print job receiver 32 (S10). Then, the interpreter 36 is assigned a page to be processed by the page distributor 34 (S12). The interpreter 36 interprets the PDL data of the assigned page (S14). Upon completion of the interpretation of the page, the interpreter 36 determines whether the interpretation of the overall print job has been completed (S16). If it is determined that the interpretation has not been completed, the interpreter 36 returns to S12. Then, the interpreter 36 notifies the page distributor 34 of the completion of interpretation of the current page, and is assigned the next page. The process described above is repeatedly performed until the interpretation of the overall print job has been completed.

In the page interpretation process (S14), the interpreter 36 extracts commands of the PDL data one by one, starting from the beginning of the page (S20), and interprets an extracted command to generate an intermediate data object (S22). The processes of S20 and S22 are repeatedly performed until the processing of the last command of the page has been completed (S24).

In a case where page-dependent PDL data is to be processed, each of the logical page interpreters 36-$p$ interprets commands of all the pages regardless of whether each page is an assigned page, and causes the transition of the internal state thereof in accordance with the result of the interpretation. For an assigned page, each of the logical page interpreters 36-$p$ not only interprets the page but also generates intermediate data. This allows the generation of correct intermediate data that reflects the results of the interpretation from the top page. Similarly, the dual interpreter 36-$f$ interprets all the commands of PDL data including commands for rendering objects other than a form. When generating cache data of a form in the cache mode, the dual interpreter 36-$f$ also generates intermediate data for a command for rendering the form.

The details of the intermediate data generation process (S22) differ depending on the operation mode of the interpreters 36.

Figure 8:
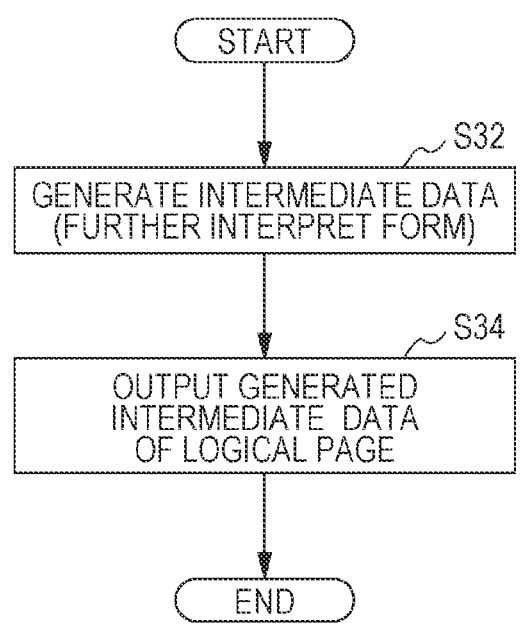
FIG. 8 illustrates an example of a command-by-command processing procedure for the logical page interpreter and the dual interpreter in a page processing mode 1.

FIG. 8 illustrates an example of the detailed processing procedure of S22, which is performed by the logical page interpreters 36-$p$ and the dual interpreter 36-$f$ in the page processing mode 1. In the illustrated example, an individual interpreter 36 interprets all the commands in an assigned page regardless of whether each of the commands is a command for rendering an object other than a form or a command for rendering a form, and generates intermediate data representing the results of interpreting all the commands (S32). Then, the interpreter 36 outputs the generated intermediate data as intermediate data of the page (S34). Therefore, intermediate data of a page which is generated by each of the interpreters 36 in the page processing mode 1 also includes intermediate data representing an image of a form included in page.

Figure 9:
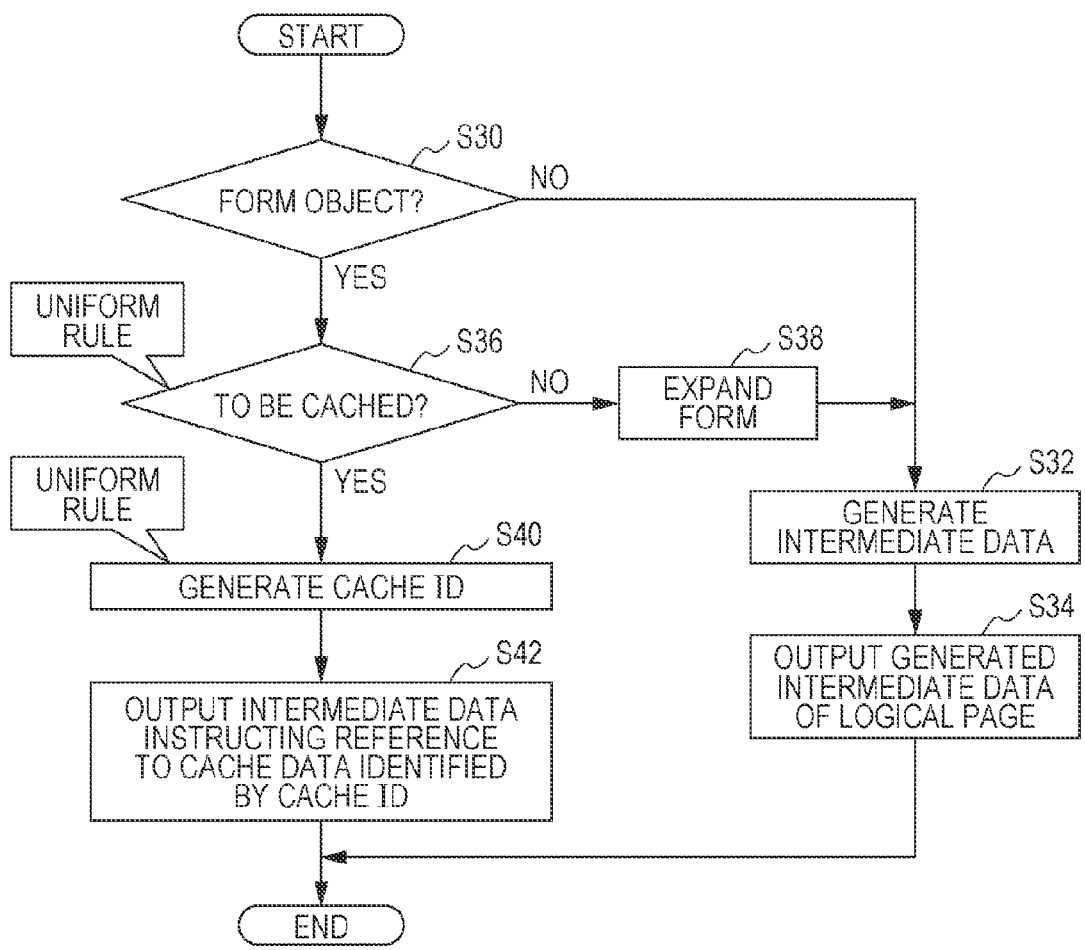
FIG. 9 illustrates an example of a command-by-command processing procedure for the logical page interpreter in a page processing mode 2.

FIG. 9 illustrates an example of the processing procedure of the intermediate data generation process (S22), which is performed by the logical page interpreters 36-$p$ in the page processing mode 2. In the illustrated example, an individual logical page interpreter 36-$p$ determines whether the command being processed (the command extracted in S20) is a rendering command instructing the generation of a form object (S30). For example, in the case of PostScript (registered trademark), if the command being processed has the command name "form", the command is a command instructing the generation of a form object. A command instructing the generation of a form is accompanied by a form ID as a parameter.

If the determination result of S30 is negative (NO: a command other than a form generation command), the logical page interpreter 36-$p$ interprets the command to generate intermediate data (S32), and outputs the intermediate data as intermediate data of the page (S34).

If the determination result of S30 is positive (YES: a form generation command), the logical page interpreter 36-$p$ determines whether intermediate data of the form corresponding to the command is to be cached, in accordance with the uniform determination rule described above (S36).

If it is determined in S36 that the command is not to be cached (the determination result of S36 is negative (NO)), the logical page interpreter 36-$p$ extracts a form ID accompanying the command, acquires PDL data of the form corresponding to the form ID, and expands the PDL data onto a memory (S38). For example, only a form ID may be presented but PDL data representing the entity of the form may not be written in locations where the form is used the second and subsequent times in the PDL data. Even in such a case, the logical page interpreter 36-*p* manages PDL data of the form that is read from the location where the form was used the first time in PDL data of the print job in association with the form ID. Thus, the managed PDL data is read and used for the place where the form is used the second and subsequent times. After expanding the PDL data of the form, the logical page interpreter 36-*p* interprets the expanded PDL data to generate intermediate data (S32), and outputs the intermediate data (S34).

If it is determined in S36 that the command being determined is to be cached (the determination result of S36 is positive (YES)), the logical page interpreter 36-*p* generates a cache ID corresponding to the command in accordance with the uniform ID assignment rule described above (S40). In S40, the logical page interpreter 36-*p* extracts values of items included in keyword data using a group of parameters accompanying the command, such as the form ID, and information on the internal state of the logical page interpreter 36-*p*, combines the extracted values to generate keyword data, and calculates the hash value of the keyword data. The hash value and the keyword data are formed as a pair which is used as a cache ID.

Then, the logical page interpreter 36-*p* generates an intermediate data command ("cache reference command") instructing the reference to the cache data identified by the cache ID, and outputs the generated intermediate data command (S42). In this manner, for a cached form, each of the logical page interpreters 36-*p* generates a cache data reference command instead of generating intermediate data representing the entity (image) of the form.

Figure 10:
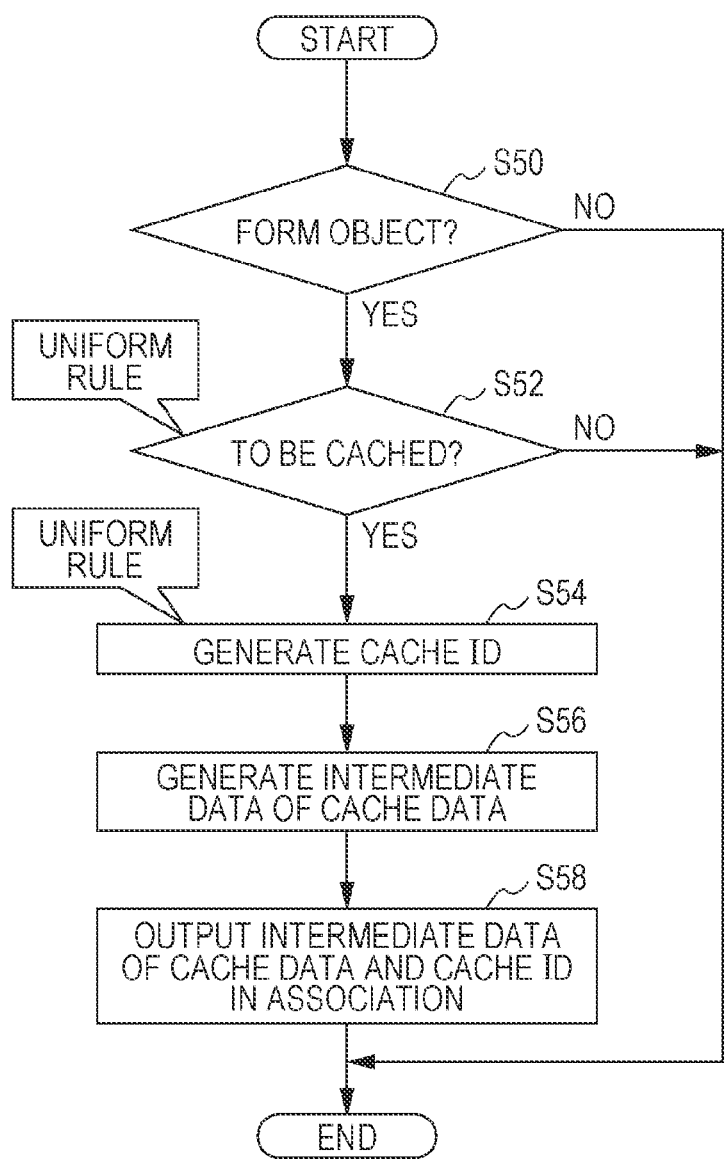
FIG. 10 illustrates an example of a command-by-command processing procedure for the dual interpreter in a cache mode.

FIG. 10 illustrates an example of the processing procedure of the intermediate data generation process (S22) performed by the dual interpreter 36-*f* in the cache mode. In the illustrated example, the dual interpreter 36-*f* determines whether the command being processed (the command extracted in S20) is a command instructing the generation of a form object, using a method similar to that in S30 (S50). If the determination result of S50 is negative (NO), the dual interpreter 36-*f* terminates the process illustrated in FIG. 10 without performing any processing on the command.

If the determination result of S50 is positive (YES), the dual interpreter 36-*f* determines whether intermediate data of the form corresponding to the command is to be cached, in accordance with the uniform determination rule described above in a manner similar to that in S36 (S52).

If it is determined in S52 that the command is not to be cached (the determination result of S52 is negative (NO)), the dual interpreter 36-*f* terminates the process illustrated in FIG. 10 without performing any processing on the command.

If it is determined in S52 that the command being determined is to be cached (the determination result of S52 is positive (YES)), the dual interpreter 36-*f* generates a cache ID corresponding to the command using a method similar to that in S40 in accordance with the uniform ID assignment rule described above (S54). Then, the dual interpreter 36-*f* interprets the command to generate cache data (intermediate data of the form) (S56), and outputs the generated cache data in association with the cache ID (S58). The output cache ID and cache data are formed as a pair which is registered in the form cache 48.

In S56 and S58, the generation and registration of the same cache data may be avoided for redundancy. To this end, the dual interpreter 36-*f* may query the cache management unit 38 as to whether the cache data corresponding to the cache ID generated in S54 is present in the form cache 48 before cache data is generated, and may generate cache data upon receipt of a response indicating that the cache data is not present. If cache data is generated and registered in the form cache 48, the dual interpreter 36-*f* registers the cache ID of the cache data in the cache management unit 38 so that the cache data is recorded as having been registered.

The operation of the dual interpreter 36-*f* in the page processing mode 1 is substantially the same as that illustrated in FIG. 8.

Next, an example of the processing procedure for the renderer 44 of the back-end device 40 will be described with reference to FIGS. 11 and 12.

Figure 11:
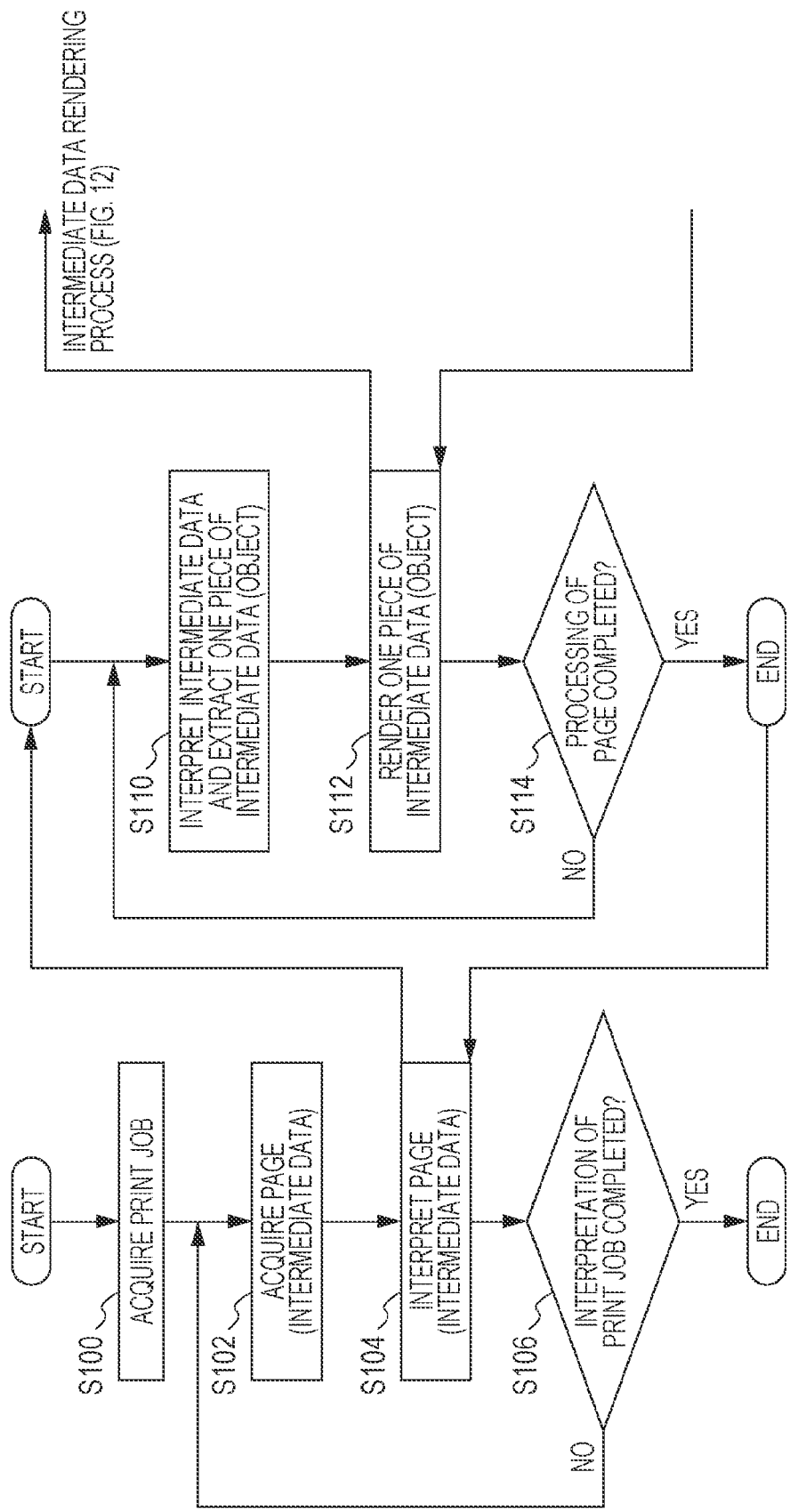
FIG. 11 illustrates an example of an overall processing procedure for a renderer.

As illustrated in FIG. 11, in the illustrated procedure, the renderer 44 first receives specification of a print job to be processed (S100). Then, the renderer 44 acquires from the intermediate data buffer 42 intermediate data of pages one by one in order, starting from, for example, the top page of the print job (S102), and interprets the acquired intermediate data of the pages (S104). The processes of S102 and S104 are repeatedly executed on a page-by-page basis until the end of the print job (S106).

In the process for interpreting intermediate data of a page (S104), the renderer 44 extracts commands of the intermediate data one by one, starting from the beginning of the page (S110), and interprets each of the extracted commands to render a raster image indicated by the command on a memory (S112). The processes of S110 and S112 are repeatedly performed until the processing of the last intermediate data command of the page has been completed (S114).

Figure 12:
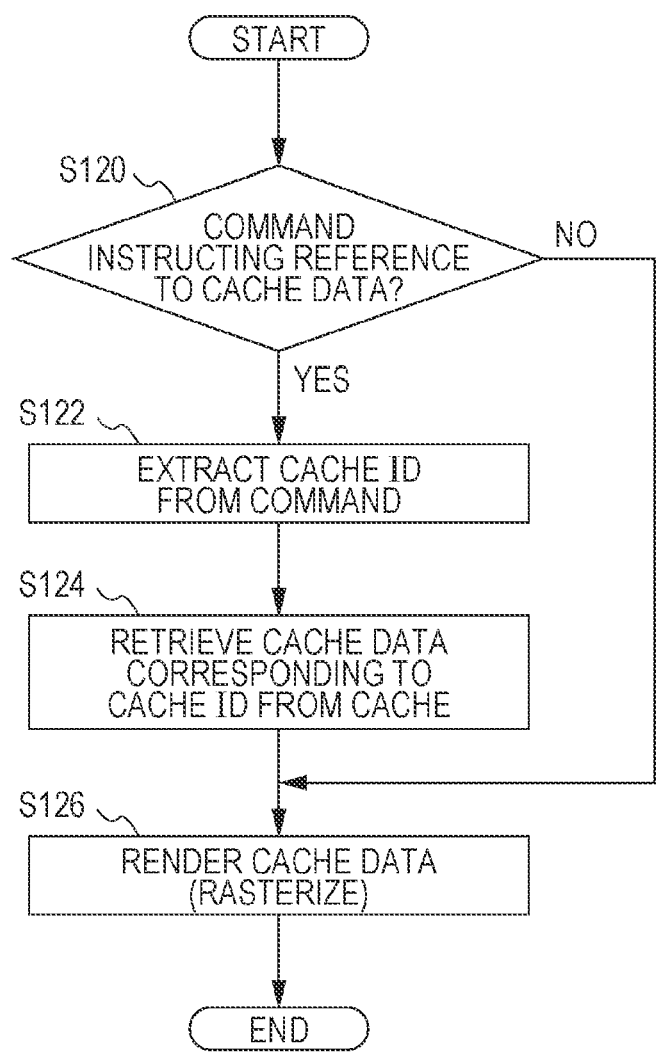
FIG. 12 illustrates an example of a procedure of a command-by-command rendering process for the renderer.

In the process for interpreting intermediate data of a page (S112), as illustrated in FIG. 12, the renderer 44 reads commands of the intermediate data of the page in order, starting from the beginning of the page, and determines whether a read command is a command instructing the reference to cache data (referred to as a "cache reference command") (S120).

If the determination result of S120 is positive (YES), the renderer 44 extracts a cache ID from the cache reference command (S122), and retrieves the cache data (intermediate data) corresponding to the cache ID from the form cache 48 (S124). Then, the renderer 44 interprets the retrieved cache data to render a raster image (or "perform rasterization") (S126).

If the determination result of S120 is negative (NO), the renderer 44 interprets the command to perform rasterization (S126).

The foregoing description has been given of the print controller 20 according to an exemplary embodiment. As described above, in this exemplary embodiment, during the "initial period" of a print job, all the interpreters 36 included in the front-end device 30 operate in the page processing mode 1, and process different pages in parallel. This may allow a group of initial pages in the print job to be processed rapidly, compared to the case where one of the interpreters 36 is used exclusively for the processing of forms from the beginning of the print job.

During the "normal period", the logical page interpreters 36-*p* and the dual interpreter 36-*f* assign cache IDs from the same material (that is, a form ID and other parameters defining an image obtained as a result of printing of the form) using a uniform ID assignment rule. This may allow the interpreters 36 to assign the same cache ID to the same cache data without performing mutual communication. Accordingly, cache data identified by cache IDs of cache reference commands included in intermediate data of pages generated by the logical page interpreters 36-$p$1 and 36-$p$2 is definitely generated by the dual interpreter 36-$f$, whether sooner or later, and is registered in the form cache 48 in association with the same cache ID. If cache data specified by a cache reference command in a page is not present in the form cache 48 at the time when the renderer 44 is to process the command, the renderer 44 may be allowed to acquire the cache data from the form cache 48 after waiting for a while. In this exemplary embodiment, there is a lead time, which represents the time it takes for the renderer 44 to process the intermediate data of the interpretation results of the interpreters 36 including the dual interpreter 36-$f$ during the "initial period". During this lead time, the dual interpreter 36-$f$ starts to operate as a form-dedicated device, which then may expedite the generation of cache data of forms to which the interpretation results obtained by the logical page interpreters 36-$p$ operating in parallel refer. The renderer 44 does not need to wait for cache data necessary for the processing of each logical page to be generated, compared to the case where the dual interpreter 36-$f$ operates as a form-dedicated device from the beginning of the print job. In some cases, such a waiting time may not substantially occur.

As described above, during the "normal period", intermediate data of a form may be cached and recycled even if the logical page interpreters 36-$p$1 and 36-$p$2 and the dual interpreter 36-$f$ operate independently and asynchronously without performing interprocess communication. Because of no overhead for interprocess communication, the image processing system according to this exemplary embodiment may achieve higher speed processing than that for a system in which interprocess communication is performed.

First Exemplary Modification

In the exemplary embodiment described above, in the page processing mode 1, the interpreters 36 merely generate intermediate data of the respective pages, and do not register intermediate data of forms, which may be obtained during the generation of the intermediate data of the respective pages, in the form cache 48. In a first exemplary modification, in contrast, each of the interpreters 36 in the page processing mode 1 registers generated intermediate data of a form in the form cache 48.

Figure 13:
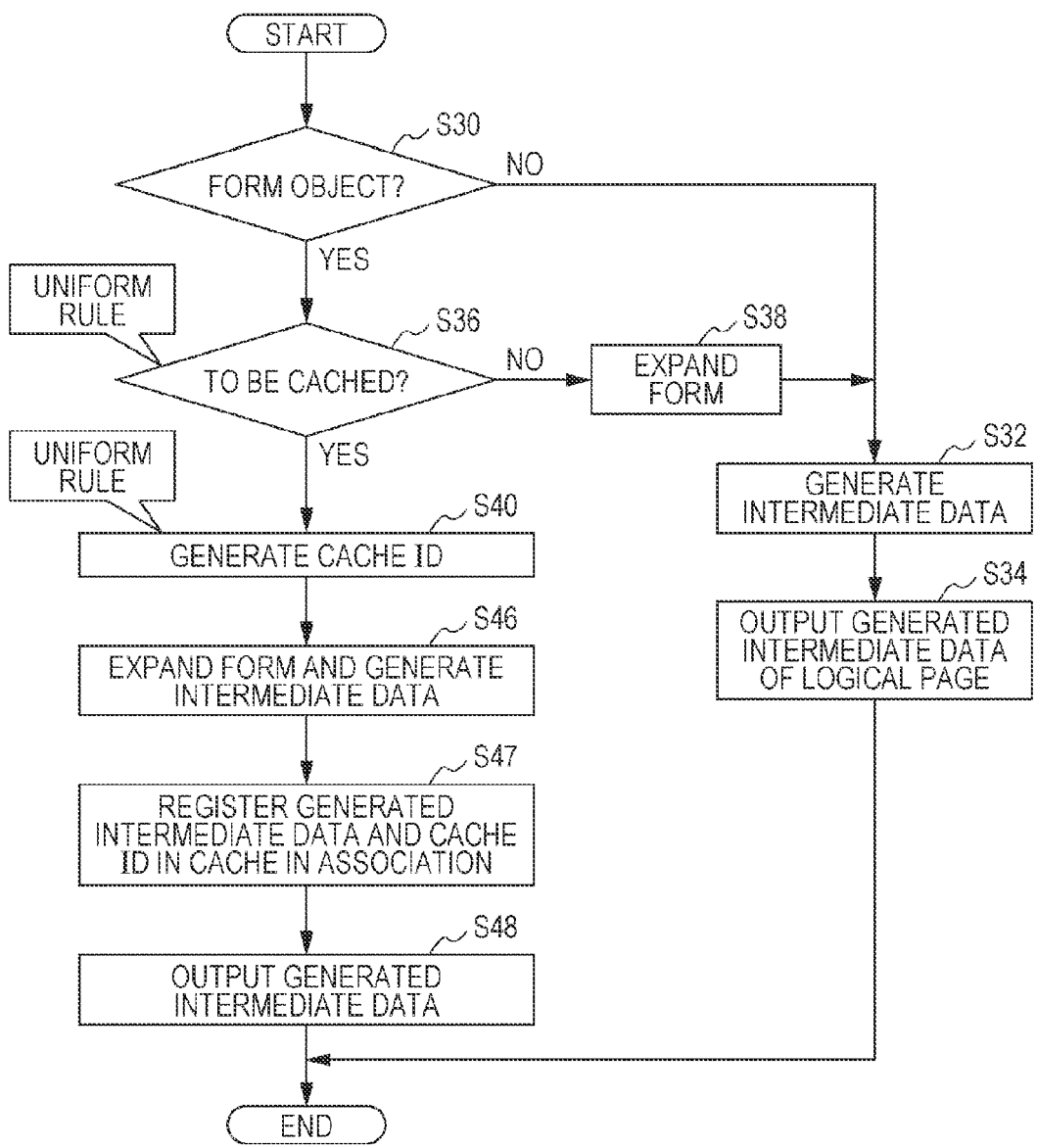
FIG. 13 illustrates an example of a command-by-command processing procedure for a logical page interpreter and a dual interpreter according to a first exemplary modification in a page processing mode 1.

FIG. 13 illustrates an example of the procedure for the page processing mode 1 according to the first exemplary modification. The procedure illustrated by way of example in FIG. 13 is somewhat similar to the procedure for the page processing mode 2 illustrated by way of example in FIG. 9. In FIG. 13, steps similar to the steps illustrated in FIG. 9 are assigned the same numerals as those illustrated in FIG. 9.

As illustrated in FIG. 13, in the page processing mode 1, an individual interpreter 36 determines whether the command being processed (the command extracted in S20) is a rendering command instructing the generation of a form object (S30). If the determination result of S30 is negative (NO: a command other than a form generation command), the interpreter 36 interprets the command to generate intermediate data (S32), and outputs the intermediate data as intermediate data of the page (S34).

If the determination result of S30 is positive (YES: a form generation command), the interpreter 36 determines whether intermediate data of the form corresponding to the command is to be cached, in accordance with the uniform determination rule described above (S36).

If it is determined in S36 that the command is not to be cached (the determination result of S36 is negative (NO)), the interpreter 36 extracts a form ID accompanying the command, acquires PDL data of the form corresponding to the form ID, and expands the PDL data onto a memory (S38). Then, the interpreter 36 interprets the expanded PDL data to generate intermediate data (S32), and outputs the generated intermediate data (S34).

If it is determined in S36 that the command being determined is to be cached (the determination result of S36 is positive (YES)), the interpreter 36 generates a cache ID corresponding to the command in accordance with the uniform ID assignment rule described above (S40). Further, the interpreter 36 expands and interprets PDL data of the form to generate intermediate data of the form (S46), and registers the generated intermediate data in the form cache 48 in association with the cache ID generated in S40 (S47). Then, the interpreter 36 outputs the intermediate data of the form generated in S46 to the intermediate data buffer 42 as part of the interpretation results of the logical page (S48).

In the procedure illustrated in FIG. 13, the interpreter 36 may query the cache management unit 38 as to whether cache data identified by the cache ID generated in S40 has been registered in the form cache 48 (or is being created by any other interpreter 36) (interprocess communication). If it is determined as a result of the query that the cache data has been registered (or is being created), the interpreter 36 performs the process of S42 for the page processing mode 2 (FIG. 9) instead of the processes of S46 to S48. This may prevent redundant creation and registration of cache data. If it is determined as a result of the query that the cache data identified by the cache ID has not been created, the interpreter 36 notifies the cache management unit 38 that the interpreter 36 is to create the cache data identified by the cache ID. In response to the notification, the cache management unit 38 makes a record indicating that the cache data identified by the cache ID is being created, and responds to a query from any other interpreter 36 in accordance with the record.

Second Exemplary Modification

Figure 6:
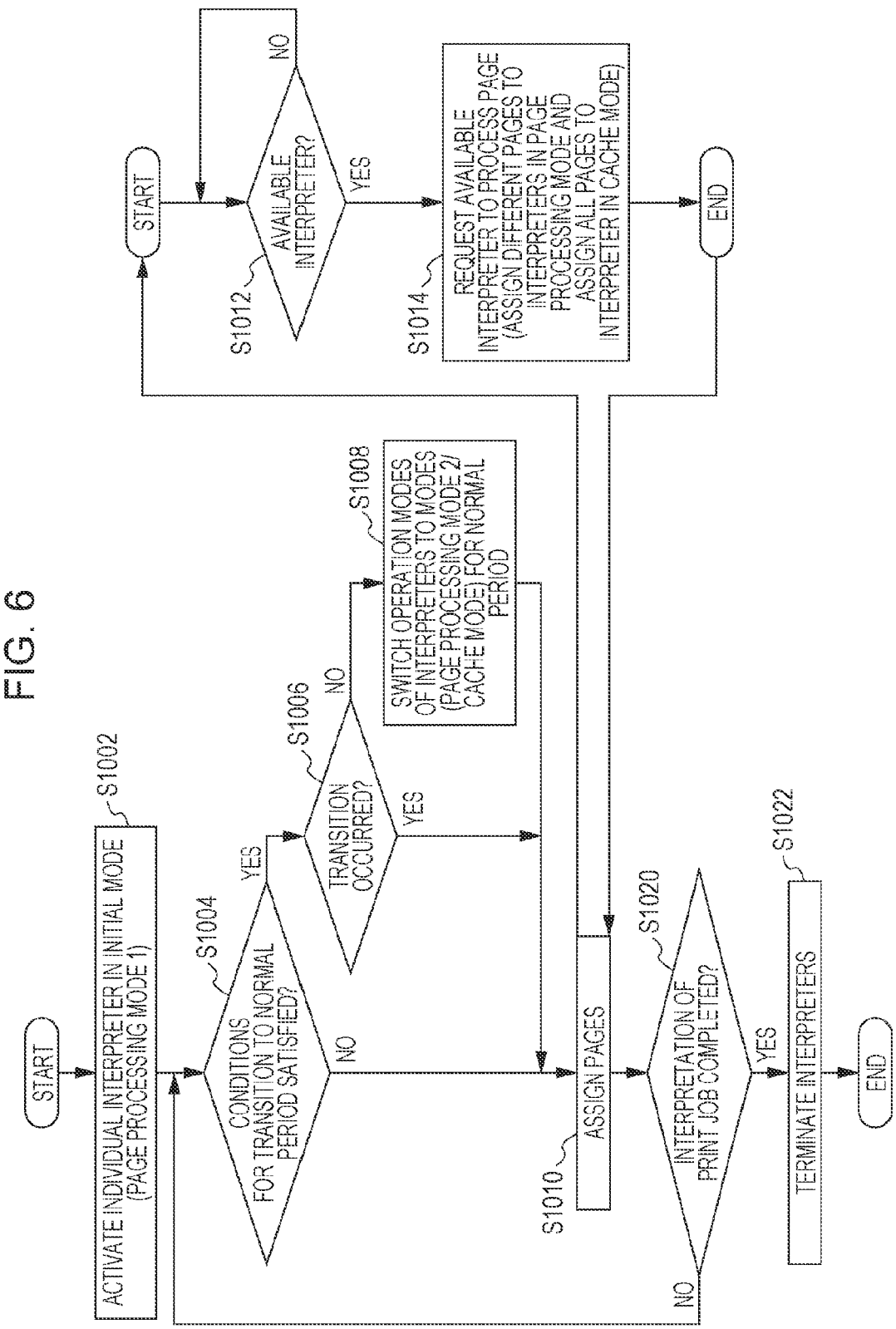
FIG. 6 illustrates an example of a processing procedure for a page distributor.
Figure 14:
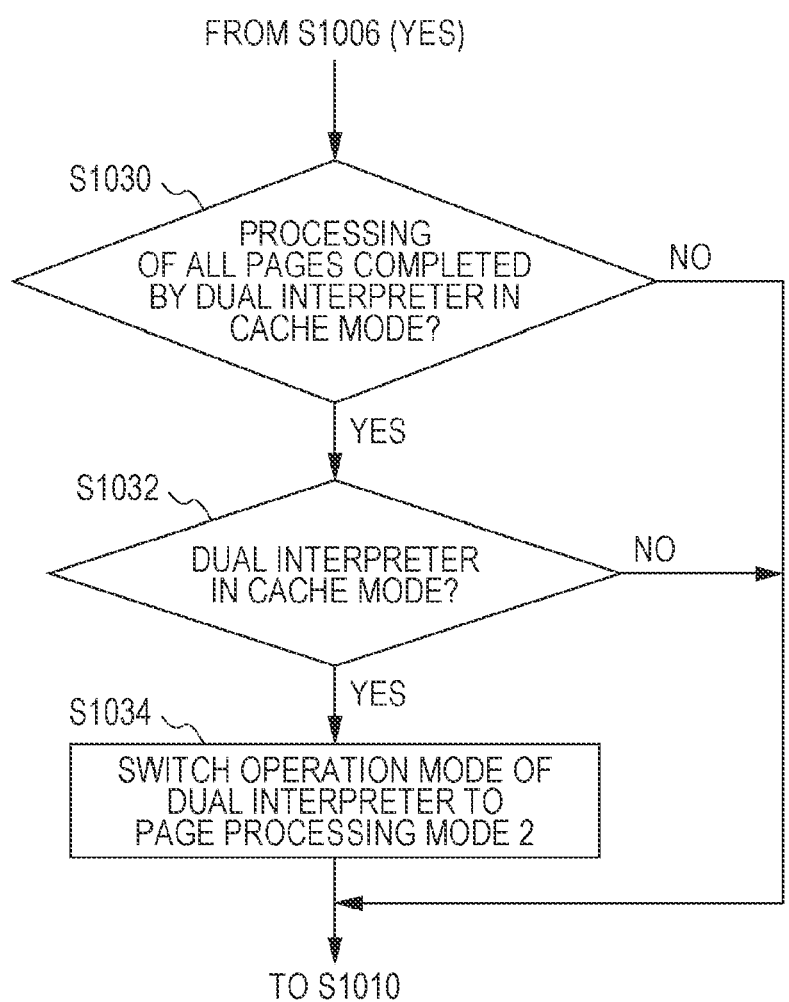
FIG. 14 illustrates part of a processing procedure for a page distributor according to a second exemplary modification.

A second exemplary modification is an exemplary modification concerning the processing procedure of the page distributor 36 (FIG. 6). In the second exemplary modification, referring to FIG. 14, if the determination result of S1006 in the procedure illustrated in FIG. 6 is positive (YES: the transition to the "normal period" has occurred), the page distributor 34 further determines whether the dual interpreter 36-$f$ has completed the processing of pages up to the last page in the print job (S1030). If the determination result is positive (YES), the page distributor 34 determines whether the current operation mode of the dual interpreter 36-$f$ is the cache mode (S1032). If the determination result is positive (YES), the page distributor 34 switches the operation mode of the dual interpreter 36-$f$ to the page processing mode 2 (FIG. 9) (S1034), and then proceeds to S1010 in FIG. 6. if the determination result of S1030 or S1032 is negative (NO), the page distributor 34 skips the process of S1034, and proceeds to S1010 (the operation mode of the dual interpreter 36-$f$ is maintained at the cache mode).

Third Exemplary Modification

In the front-end device 30 according to the exemplary embodiment described above, the logical page interpreters 36-$p$1 and 36-$p$2 and the dual interpreter 36-$f$ do not perform interprocess communication for caching during the normal period. In a third exemplary modification, in contrast, during the normal period, the front-end device 30 has two operation modes, namely, a mode in which interprocess communication is not performed (referred to as a "non-interprocess communication mode"), as in the exemplary embodiment described above, and a mode in which the logical page interpreters 36-*p*1 and 36-*p*2 and the dual interpreter 36-*f* perform interprocess communication for caching (referred to as an "interprocess communication mode"). The switching of an operation mode in accordance with the situation may ensure more accurate cache control. For the logical page interpreters 36-*p* during the "normal period", the "non-interprocess communication mode" represents the "page processing mode 2" described above (see FIG. 9).

Figure 15:
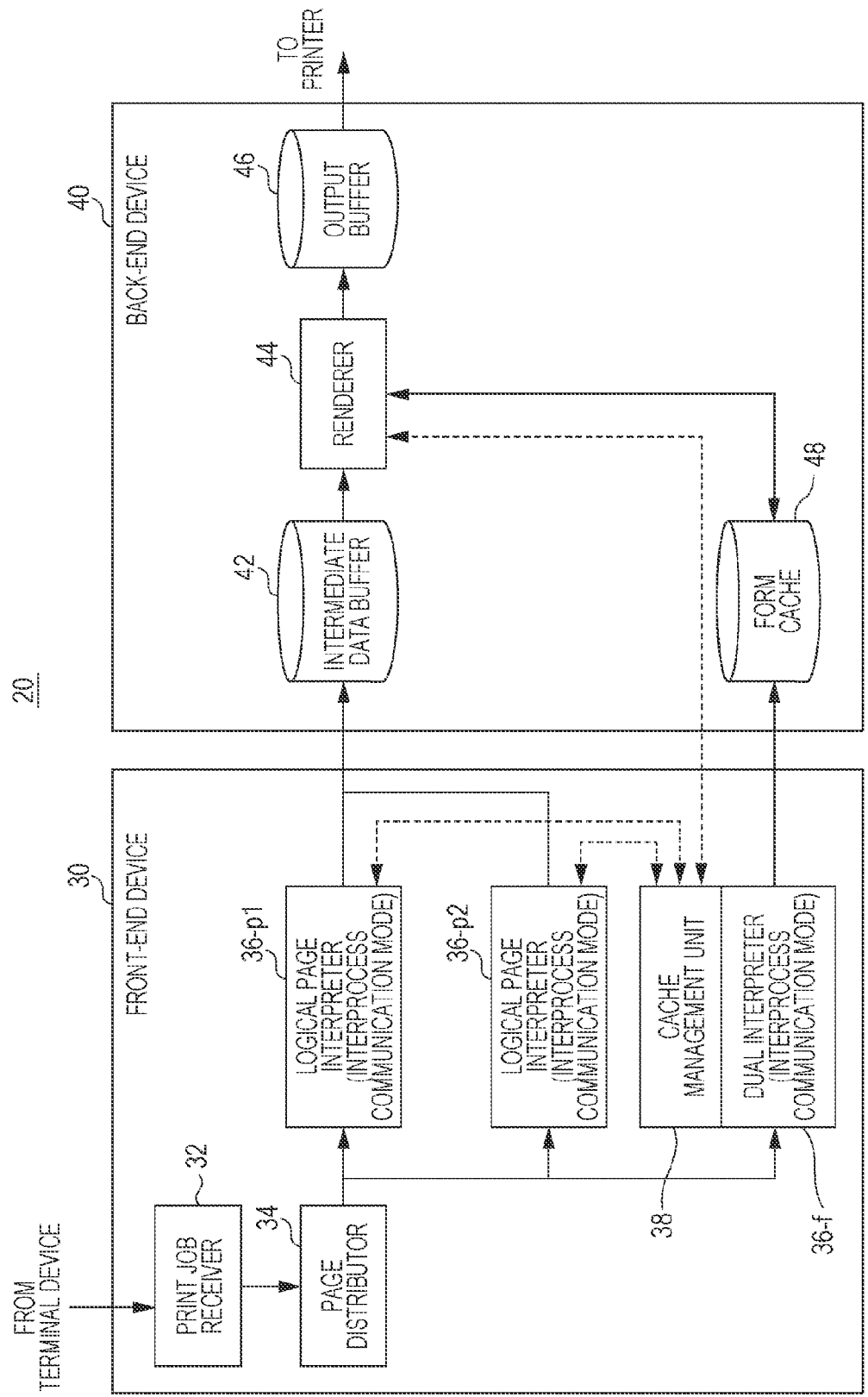
FIG. 15 is a block diagram illustrating an example of an internal configuration of a print controller having an interprocess communication mode according to a third exemplary modification.

FIG. 15 illustrates an example configuration of a print controller 20 according to this exemplary modification. In FIG. 15, elements similar to the elements illustrated by way of example in FIG. 4 are assigned the same numerals.

The configuration illustrated by way of example in FIG. 15 is different from the configuration illustrated in FIG. 4 in that the logical page interpreters 36-*p*1 and 36-*p*2 communicate with the cache management unit 38 in the interprocess communication mode (and in that processing procedures are switched in accordance with the communication).

Figure 16:
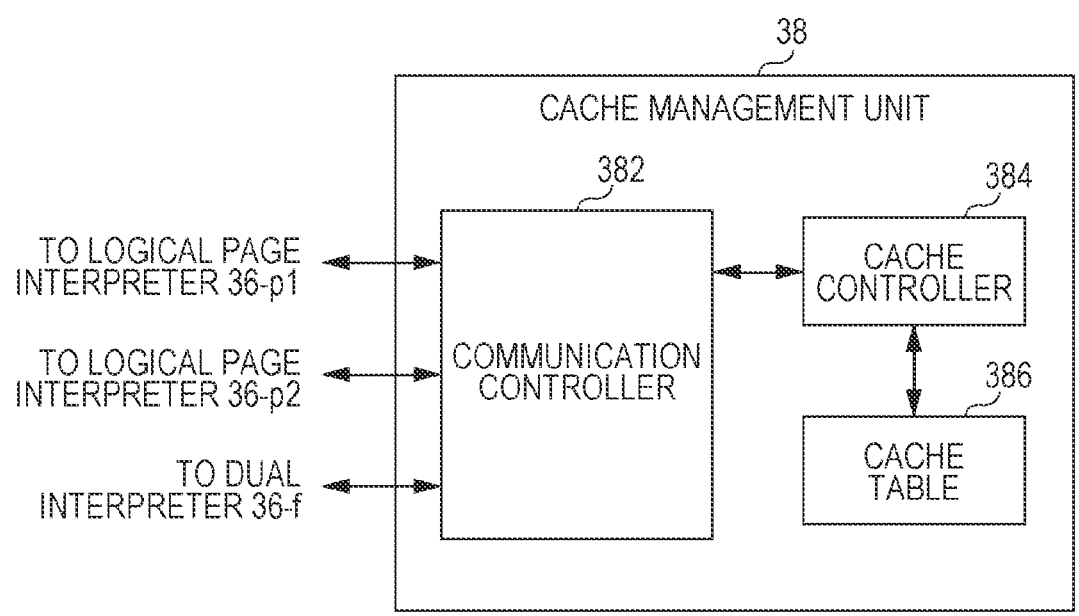
FIG. 16 is a block diagram illustrating an example of an internal configuration of a cache management unit having an interprocess communication mode according to the third exemplary modification.

FIG. 16 illustrates an example of an internal configuration of the cache management unit 38 according to the exemplary modification illustrated in FIG. 15. The cache management unit 38 may be part of the dual interpreter 36-*f*, or may be implemented as a process separate from that for the dual interpreter 36-*f*. In the following description, by way of example, the cache management unit 38 is part of the dual interpreter 36-*f*.

In the illustrated example, the cache management unit 38 includes a communication controller 382, a cache controller 384, and a cache table 386. The communication controller 382 controls communication with the multiple interpreters 36. The communication controller 382 receives requests, such as cache queries, from the interpreters 36, arbitrates among the requests, and passes a request to the cache controller 384. The cache controller 384 performs an operation for the cache table 386 in accordance with the request received via the communication controller 382. The cache table 386 is a table that holds management information on cache data registered in the form cache 48.

As illustrated in FIG. 17, the cache table 386 has registered therein, for each piece of cache data, a cache ID (here, the hash value of the keyword data described above), the keyword data, and information on the storage location of the entity of the cache data in the form cache 48. In the illustrated example, cache data is stored in a memory by way of example, and the information on the storage location is represented by the top address and the size of the storage location. Accordingly, cache data may be saved and managed as files instead of being stored in a memory. In this case, the file name of a file storing cache data, rather than the set of address and size, may be recorded as the "storage location".

In the illustrated example, in a case where the entity of cache data is deleted from the form cache 48, the value of the storage location of the cache data in the cache table 386 is changed to a predetermined invalid address and size (for example, NULL values). Therefore, if the entry corresponding to the cache ID (the set of hash value and keyword data) is present in the cache table 386 and the storage location for the entry is set to a non-NULL value, the entity data (cache data) corresponding to the cache ID is present in the form cache 48.

In the example illustrated in FIG. 17, furthermore, an access count value and a reference count value are recorded for each cache entry in the cache table 386 as numerical value information for cache management.

An access count value is a value indicating the cumulative frequency of use of cache data of the associated entry, and is added by one each time an interpreter 36 refers to the cache ID of the entry. As used herein, the term "referring to" is used when a cache reference command indicating reference to the associated cache ID is incorporated into intermediate data. If, as a result of a query regarding a cache ID to process a form, a logical page interpreter 36-*p* creates intermediate data representing the entity of the form, rather than a cache reference command, the access count value for the cache ID is not incremented. Cache data having a larger access count value has been more frequently used in the previous processing of the print job (that is, the cache data has been printed a larger number of times), and would more largely contribute to the increase in processing speed with the use of a cache.

A reference count value is a value indicating the number of references to cache data of the associated entry in intermediate data of pages in the intermediate data buffer 42 (that is, intermediate data that has not been processed by the renderer 44). This value is added by one each time an interpreter 36 refers to the cache ID of the entry, and decreases by one each time the renderer 44 refers to the cache ID of the entry (that is, the cache data of the entry is rendered). If the reference count value for a certain entry is greater than or equal to 1, the intermediate data buffer 42 includes a page for which the cache data of the entry is referred to, and therefore it is difficult to delete the cache data from the form cache 48. If the reference count value for a certain entry is equal to 0, the cache data of the entry may be deleted at the current time point.

In the interprocess communication mode, the access count values and the reference count values are incremented (increase by 1) in accordance with the reference from the logical page interpreters 36-*p*, and are not incremented in accordance with the reference from the dual interpreter 36-*f*. The logical page interpreters 36-*p* process a group of pages in a print job in a shared manner, and the dual interpreter 36-*f* processes all the pages in the print job. Counting references from the logical page interpreters 36-*p* and the dual interpreter 36-*f* may lead to double counting. To avoid such double counting, by way of example, only the references from the logical page interpreters 36-*p* are counted. The reason for counting the references from the logical page interpreters 36-*p* rather than the dual interpreter 36-*f* is that the number of references from the logical page interpreters 36-*p* more directly reflects the number of times cache data has been actually referred to in order to generate print images of logical pages. However, this is merely an example, and the references from the dual interpreter 36-*f* may be counted in the interprocess communication mode.

In the non-interprocess communication mode, the access count values and the reference count values are incremented (increase by 1) in accordance with the reference from the dual interpreter 36-*f*. In the non-interprocess communication mode, no references from the logical page interpreters 36-*p* are made.

The cache controller 384 monitors the cache table 386 (and therefore the form cache 48) to determine what size of cache data has been registered or deleted, and updates and manages the available capacity of the form cache 48 (that is, "the capacity of the form cache 48" minus "the total size of the cache data in the form cache 48") in accordance with the monitoring process.

Requests sent from the interpreters 36 to the cache controller 384 may include, for example, a query request, an area reservation request, and a registration request.

The query request is a request for querying whether cache data is present in the form cache 48, and a cache ID (a set of hash value and keyword data) identifying the cache data is used as an argument. Upon receiving a query request, the cache controller 384 searches the cache table 386 for an entry corresponding to the cache ID that is the argument of the request. If such an entry is found and the value of the storage location for the entry is valid, the cache controller 384 determines that "the corresponding cache data is present", and determines that "the corresponding cache data is not present" otherwise. The cache controller 384 sends the determination result to the requesting interpreter 36 via the communication controller 382.

The area reservation request is a request for requesting that the capacity to store the cache data generated by an interpreter 36 be reserved, and, for example, a cache ID (a set of hash value and keyword data) identifying the cache data and the size of the cache data are used as arguments. Upon receiving an area reservation request, the cache controller 384 determines whether the size of the cache data, which is the argument, is less than or equal to the available capacity of the form cache 48. If the size is less than or equal to the available capacity, the cache controller 384 reserves a storage location having a size corresponding to the size, and returns an "area reserved" response including information indicating the storage location (for example, the top address and the size). If the size of the cache data, which is the argument, exceeds the available capacity of the form cache 48, the cache controller 384 determines whether the area corresponding to the size is reserved by deleting cache data stored in the form cache 48. Here, the cache controller 384 may determine whether the available capacity to accommodate the size of the cache data to be newly registered is reserved by searching the cache table 386 for an entry whose reference count value is equal to 0 and deleting the actual data of entries found as results of the search. Not all the pieces of cache data whose reference count values are equal to 0 may be deleted, but a minimum number of pieces of cache data may be deleted to reserve the available capacity to accommodate the size of the cache data to be registered. In the case, cache data may be preferentially selected as data to be deleted, starting from the cache data having the lowest access count value (that is, the least frequently used cache data).

If the available capacity to meet the area reservation request is obtained in this manner by the deletion of pieces of cache data whose reference count values are equal to 0, the cache controller 384 deletes the respective pieces of cache data selected as items to be deleted from the form cache 48, and reserves a storage location having a size corresponding to the requested size in the available capacity. Then, the cache controller 384 returns a response indicating "successful area reservation" to the requesting interpreter 36. The response includes a cache ID, and information (for example, a set of top address and size) indicating the reserved storage location. The cache controller 384 changes the data in the "storage location" for the entry of the cache in the cache table 386 to a predetermined value indicating "invalid". The interpreter 36 that has received the response indicating "successful area reservation" sends a cache data registration request to the cache management unit 38.

If it is difficult to obtain the available capacity to meet the area reservation request even by the deletion of all the pieces of cache data whose reference count values are equal to 0, the cache controller 384 returns a response indicating "area reservation failure" to the requesting interpreter 36. The interpreter 36 that has received the response indicating "area reservation failure" discards the generated cache data without registering it in a cache.

In the illustrated example, the dual interpreter **36-*f* creates cache data of a form, and none of the logical page interpreters 36-*p* creates cache data (that is, the logical page interpreters 36-*p* may create intermediate data of forms but do not cache it). Accordingly, an area reservation request and a registration request are issued only from the dual interpreter 36-*f***.

Next, the features of the non-interprocess communication mode and the interprocess communication mode will be described.

The non-interprocess communication mode allows high-speed processing because of no overhead for communication. However, since cache reference commands generated by the logical page interpreters **36-*p* are necessarily to be executed (the cache reference commands may not necessarily be executed immediately, but cache data specified by the cache reference commands will be present in the form cache 48), it is difficult to delete cache data from the form cache 48. If cache data is deleted from the form cache 48, cache reference commands generated by the logical page interpreters 36-*p***, which have failed to recognize the deletion, may not be executed.

In the interprocess communication mode, due to the overhead for communication, the processing speed is lower than that in the non-interprocess communication mode. Nevertheless, it may be possible to prevent collapse of a cache-based system even by the deletion of cache data from the form cache 48. Specifically, each of the logical page interpreters **36-*p* is configured to check whether cache data of a form to which the logical page interpreter 36-*p* wishes to refer is present in the form cache 48**, by using interprocess communication, and to generate intermediate data of the form if the cache data is not present.

There are two directions of switching of the operation mode of the front-end device 30: (a) switching from the interprocess communication mode to the non-interprocess communication mode, and (b) switching from the non-interprocess communication mode to the interprocess communication mode. The individual switching directions will now be described.

(a) Switching from Interprocess Communication Mode to Non-Interprocess Communication Mode This direction indicates the transition from the state of operation in the interprocess communication mode to the non-interprocess communication mode when a certain condition is satisfied. The switching in this direction is performed for, for example, the initial section of the "normal period". In this example, the front-end device 30 is caused to operate in the interprocess communication mode at the time when the normal period begins. When the front-end device 30 completes the processing of a predetermined amount (for example, a predetermined number of pages) of the print job after a transition to the normal period, the front-end device 30 switches its operation mode to the non-interprocess communication mode.

As described previously with reference to FIG. 5, in a configuration according to an exemplary embodiment, the renderer 44 may be less likely to wait for the generation of cache data even if each of the logical page interpreters **36-*p*** is caused to operate in the non-interprocess communication mode (that is, in the page processing mode 2) from the beginning of the normal period. Accordingly, there may be no need for control for initiating the operation in the interprocess communication mode for the initial section of the normal period and then switching the operation mode to the non-interprocess communication mode.

(b) Switching from Non-Interprocess Communication Mode to Interprocess Communication Mode This direction indicates the transition from the state of operation in the non-interprocess communication mode to the interprocess communication mode when a certain condition is satisfied. The switching in this direction is performed at the stage when, for example, the total amount of cache data in the form cache 48 has approached the capacity of the form cache 48 (that is, the cache becomes nearly full).

When the total amount of cache data has approached the capacity of the form cache 48, the available capacity of the form cache 48 may be short for new cache data to be registered. In this case, it is desirable that the available capacity be increased by deleting existing cache data in the form cache 48 so that new data may be registered in the form cache 48. As described above, the deletion of some cache data from the form cache 48 in the non-interprocess communication mode may make it impossible to render a page that is based on the premise that the cache data thereof is present. In the interprocess communication mode, on the other hand, each of the logical page interpreters 36-$p$ constantly checks whether cache data of a necessary form is obtainable, and generates an intermediate data command for referring to the cache data if the cache data is obtainable, or generates intermediate data indicating the entity of the form if the cache data is not obtainable. This may prevent unwanted situation such as rendering becoming impossible due to lack of expected cache data.

Conversely, in a situation where the total amount of cache data in the form cache 48 is not so large and the available capacity is sufficiently large to store newly generated cache data, the employment of the non-interprocess communication mode having a high processing speed may provide higher processing efficiency.

Accordingly, control may be performed so that the non-interprocess communication mode is used before the total amount of cache data has approached the capacity of the form cache 48 and is switched to the interprocess communication mode when the total amount of cache data has approached the capacity of the form cache 48.

Whether "the total amount of cache data has approached the capacity of the form cache 48" may be determined by, for example, comparing the total amount of cache data in the form cache 48 with a threshold value. In this example, for example, a threshold value is determined based on a memory capacity (which is equal to the upper limit value of the total amount of cache data) allocated to the form cache 48 (using a method of, for example, setting 90% of the memory capacity as a threshold value), and it is determined that "the total amount of cache data has approached the capacity of the form cache 48" when the total amount of cache data in the form cache 48 reaches the threshold value.

Next, an example of the procedure for the switching control of the operation modes according to this exemplary modification will be described. The procedure for the switching control is executed as part of the processing procedure of the page distributor 34 illustrated in FIG. 6.

Figure 18:
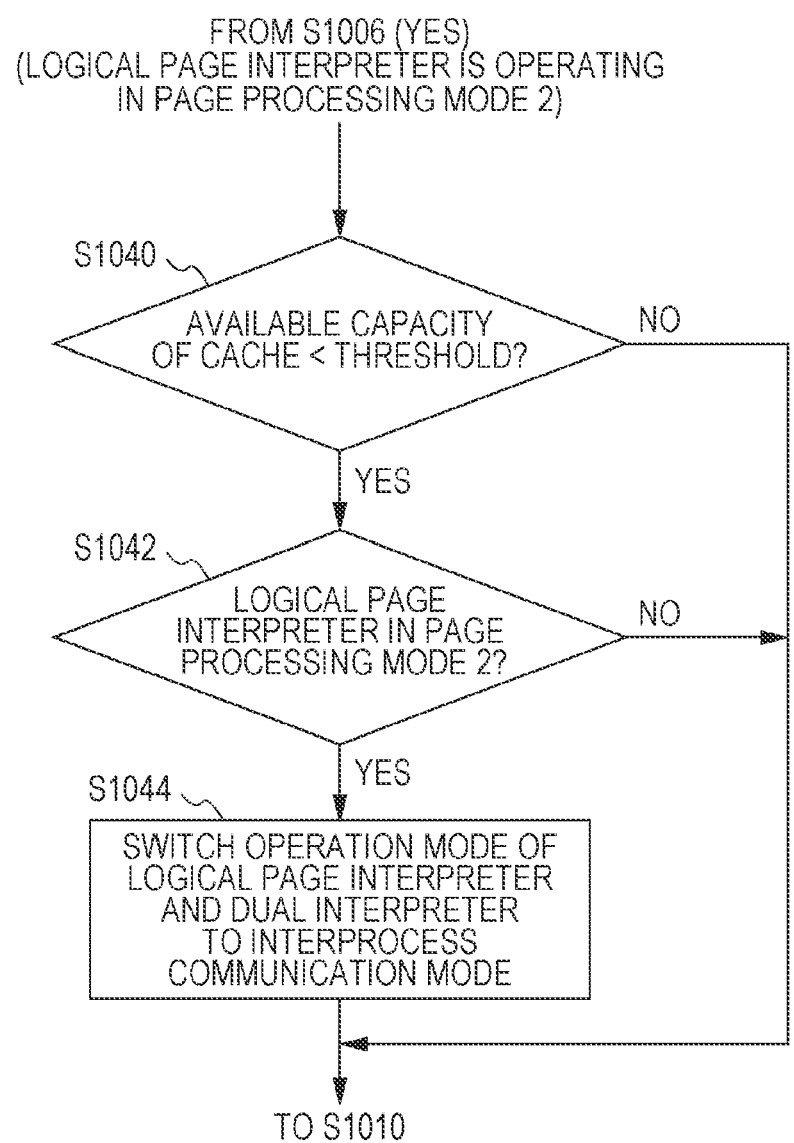
FIG. 18 illustrates an example of a processing procedure for a page distributor having an interprocess communication mode according to the third exemplary modification.

In an example, in response to a transition to the normal period, as illustrated in FIG. 18, the page distributor 34 monitors the available capacity of the form cache 48 (the available capacity may be determined by querying the cache management unit 38). If the available capacity is greater than or equal to a predetermined threshold value (the determination result of S1040 is negative (NO)), the page distributor 34 maintains the non-interprocess communication mode (the logical page interpreters 36-$p$ are in the page processing mode 2). If the available capacity of the form cache 48 is lower than the threshold value (the determination result of S1040 is positive (YES)), the page distributor 34 determines whether the logical page interpreters 36-$p$ are in the page processing mode 2 (that is, in the non-interprocess communication mode) (S1042). If the determination result of S1042 is positive (YES), the page distributor 34 switches the operation mode of the logical page interpreters 36-$p$ and the dual interpreter 36-$f$ to the interprocess communication mode (S1044), and then proceeds to S1010 (FIG. 6). If the determination result of S1040 or S1042 is negative (NO), the page distributor 34 skips the process of S1044, and proceeds to S1010. In this case, the logical page interpreters 36-$p$ are maintained at the page processing mode 2, and the dual interpreter 36-$f$ is maintained at the cache mode.

Switching the operation mode to the interprocess communication mode in S1044 enables existing cache data in the form cache 48 to be deleted, and new necessary cache data to be registered. This procedure may work well even if the capacity of the form cache 48 is lower than the total amount of intermediate data of a form to be cached which is used in the print job.

Figure 19:
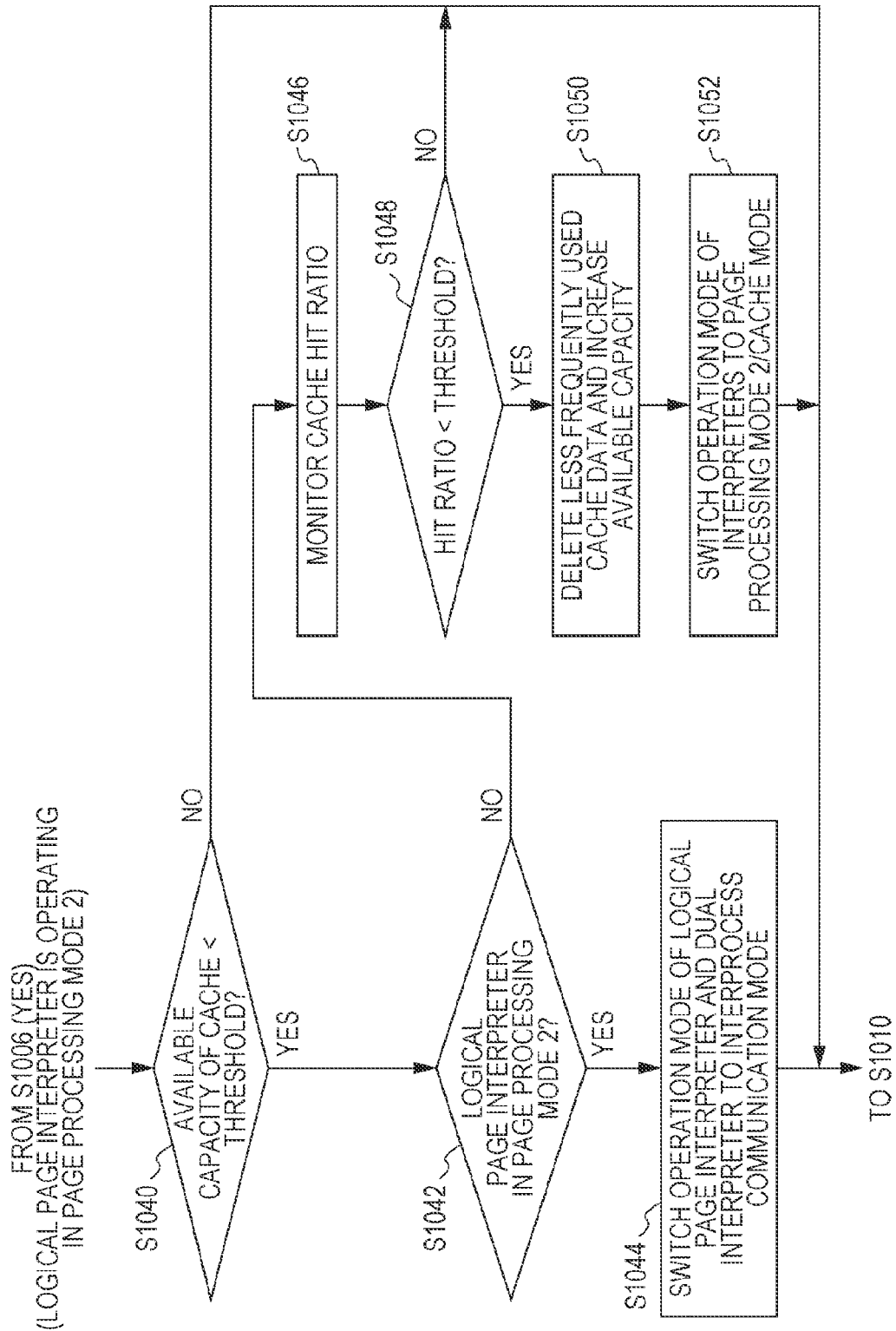
FIG. 19 illustrates an example of a processing procedure for the page distributor having an interprocess communication mode according to the third exemplary modification.

Next, the procedure illustrated in FIG. 18 according to an exemplary modification will be described with reference to FIG. 19. In FIG. 19, steps similar to the steps illustrated in FIG. 18 are assigned the same numerals, and a description thereof is omitted.

This process is based on the premise that the cache management unit 38 manages hit ratios of the form cache 48. For example, the cache management unit 38 has records of the total number of query requests of whether cache data has been received from the logical page interpreters 36-$p$, and the number of responses indicating "cache data has been received" (that is, "cache hit") with respect to the total number of query requests. The cache management unit 38 constantly determines and holds the latest hit ratio (which is given by dividing the number of hits by the total number of queries) from the recorded values.

In the procedure illustrated in FIG. 19, if the determination result of S1042 is negative (NO) (that is, if the logical page interpreters 36-$p$ are in the interprocess communication mode), the page distributor 34 queries the cache management unit 38 about the hit ratio (S1046). If the hit ratio is greater than or equal to a predetermined threshold value (the determination result of S1048 is negative (NO)), the page distributor 34 maintains the interprocess communication mode. That is, if the hit ratio is greater than or equal to the threshold value, the page distributor 34 regards the form cache 48 as being efficiently utilized, and maintains the current state.

If the hit ratio is lower than the threshold value (the determination result of S1048 is positive (YES)), this implies that the pieces of cache data stored in the form cache 48 are not frequently used. Such a situation may occur when, for example, the forms being used are replaced with different forms in the middle of the print job. That is, the cache data stored in the form cache 48 before the replacement of the forms is not frequently used after the replacement of the forms, whereas new forms after the replacement of the forms may be difficult to register in the form cache 48 due to the shortage of the available capacity, causing a reduction in hit ratio. In this case, the page distributor 34 instructs the cache management unit 38 to delete cache data that is not efficiently utilized in a batch from the form cache 48 (S1050).

In response to the instruction, the cache management unit 38 specifies cache data that is not currently efficiently utilized in accordance with the information in the cache table 386. For example, the index value of the frequency of use of each piece of cache data, which is given by dividing the "access count value" by the "total number of currently assigned pages", may be calculated. If the index value is greater than or equal to a predetermined threshold value, the cache data may be determined to be "currently efficiently utilized", and, if the index value is lower than the threshold value, the cache data may be determined not to be "currently efficiently utilized".

Then, the zero reference count part (that is, the part currently not being referred to) of the specified cache data determined not to be "currently efficiently utilized" is deleted in a batch from the form cache 48.

The value given by dividing the "access count value" by the "total number of currently assigned pages" is low for, for example, cache data that is initially utilized in the job but is not utilized later or for cache data that begins to be utilized in recent pages. Since the latter cache data is recently utilized, the latter cache data may be less likely to be deleted in a batch because it is probable that the reference count value is greater than or equal to 1.

Alternatively, as illustrated by way of example in FIG. 20, the cache table 386 may manage recent access count values in addition to a cumulative access count value, and pieces of cache data having small recent access count values (for example, recent access count values smaller than a predetermined threshold value) may be deleted in a batch in S1050. Examples of the "recent access count value" may include the sum of access count values for a predetermined number of most recent pages from the present.

After the process of S1050, the page distributor 34 switches the operation mode of each of the interpreters 36 to the non-interprocess communication mode (S1052). That is, the page distributor 34 switches the operation mode of the logical page interpreters 36-$p$ to the page processing mode 2 (FIG. 9), and the dual interpreter 36-$f$ to the cache mode (FIG. 10). Then, the page distributor 34 proceeds to S1010 in FIG. 6.

Figure 21:
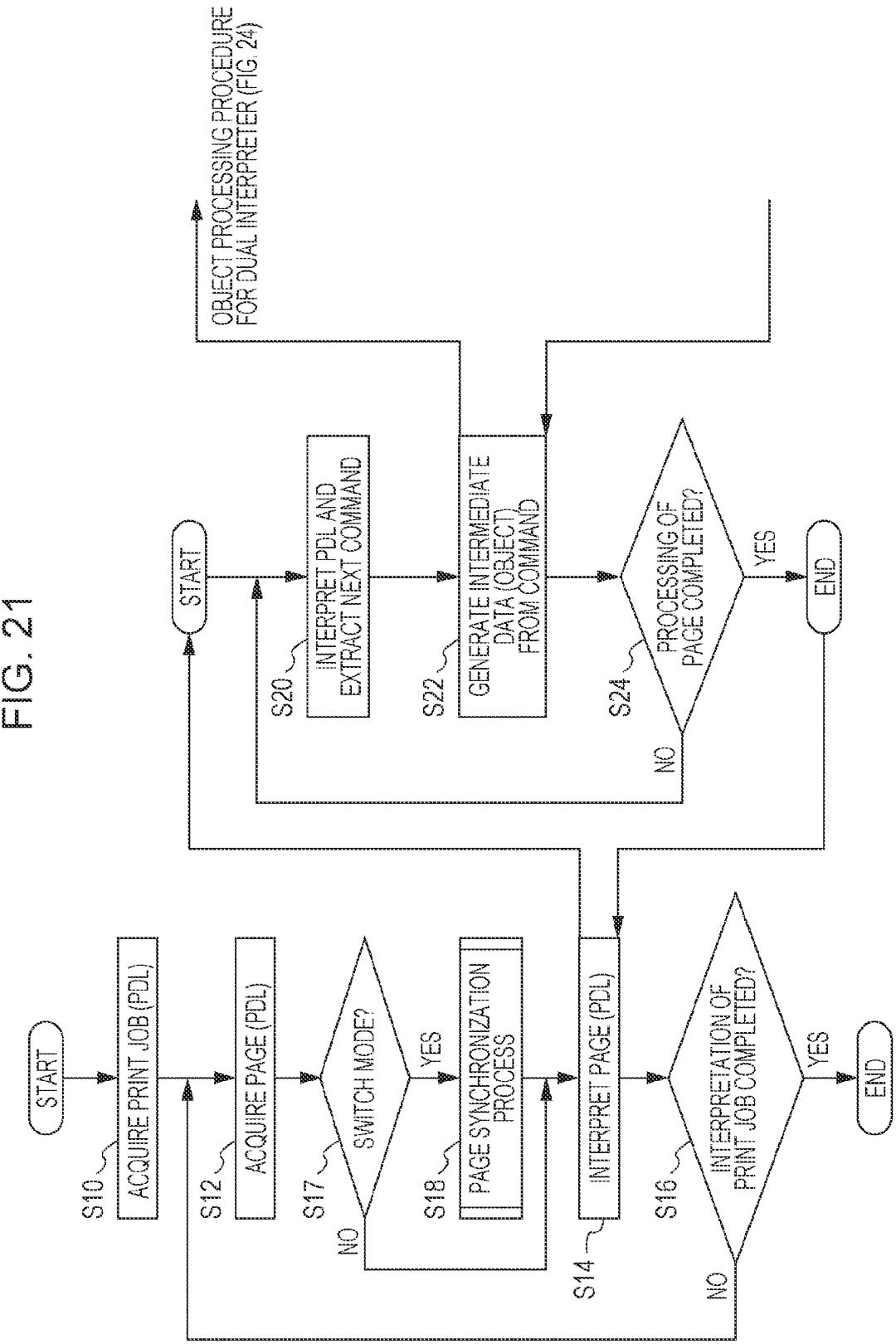
FIG. 21 illustrates an example of an overall processing procedure for a dual interpreter having an interprocess communication mode according to the third exemplary modification.

FIG. 21 illustrates an overall processing procedure for the dual interpreter 36-$f$ according to the third exemplary modification. In the illustrated procedure, the processes of S17 and S18, which may be used for the switching of operation modes, is added to the overall processing procedure for the logical page interpreters 36-$p$ and the dual interpreter 36-$f$ illustrated by way of example in FIG. 7.

In the procedure illustrated in FIG. 21, upon assignment of a new page from the page distributor 34 (S12), the dual interpreter 36-$f$ determines whether the switching of the operation mode is in progress (S17). If the "switching of the operation mode is not in progress", the process proceeds to S14. Accordingly, substantially the same process as that illustrated in FIG. 7 is performed. If the "switching of the operation mode is in progress", a page synchronization process is performed (S18).

The state where the "switching of the operation mode is in progress" is a state where the operation mode of the front-end device 30 is being switched from the interprocess communication mode to the non-interprocess communication mode or from the non-interprocess communication mode to the interprocess communication mode (transition stage). In this state, the dual interpreter 36-$f$ and the logical page interpreters 36-$p$ in the front-end device 30 perform a page synchronization process described below. During the page synchronization process, either the dual interpreter 36-$f$ or the logical page interpreters 36-$p$ suspend the processing and enter a standby state, and the other interpreter or interpreters advance the processing, thereby allowing synchronization of the pages being processed by the dual interpreter 36-$f$ and the logical page interpreters 36-$p$. The operation mode is not switched in the state where the "switching of the operation mode is in progress", and is switched after the state where the "switching of the operation mode is in progress" has been released.

In the illustrated example, upon receipt of an instruction for switching the operation mode from the interprocess communication mode to the non-interprocess communication mode or from the non-interprocess communication mode to the interprocess communication mode, the front-end device 30 enters the state where the "switching of the operation mode is in progress". In this state, the front-end device 30 prepares for the switching of the operation mode, but does not initiate switching of the operation mode. After that, the state where the "switching of the operation mode is in progress" continues until the page synchronization process is completed. When the page synchronization process is completed, the state where the "switching of the operation mode is in progress" is released, and the operation mode is switched. In the illustrated example, the page distributor 34 determines whether the switching of the operation mode in the respective directions given in the items (a) and (b) described above is needed, in accordance with information on up to which page the logical page interpreters 36-$p$ and the dual interpreter 36-$f$ have been assigned and information on the total amount of cache data currently being cached, which is managed by the cache management unit 38. If the switching of the operation mode is needed, the page distributor 34 instructs the dual interpreter 36-$f$ to switch the operation mode. In accordance with the instruction, the dual interpreter 36-$f$ enters the state where the "switching of the operation mode is in progress", and executes a page synchronization process (S18).

The page synchronization process is a process for allowing the logical page interpreters 36-$p$ operating in parallel and the dual interpreter 36-$f$ to keep pace with each other when performing page processing (that is, making the page numbers being processed by the logical page interpreters 36-$p$ and the dual interpreter 36-$f$ match).

Figure 22:
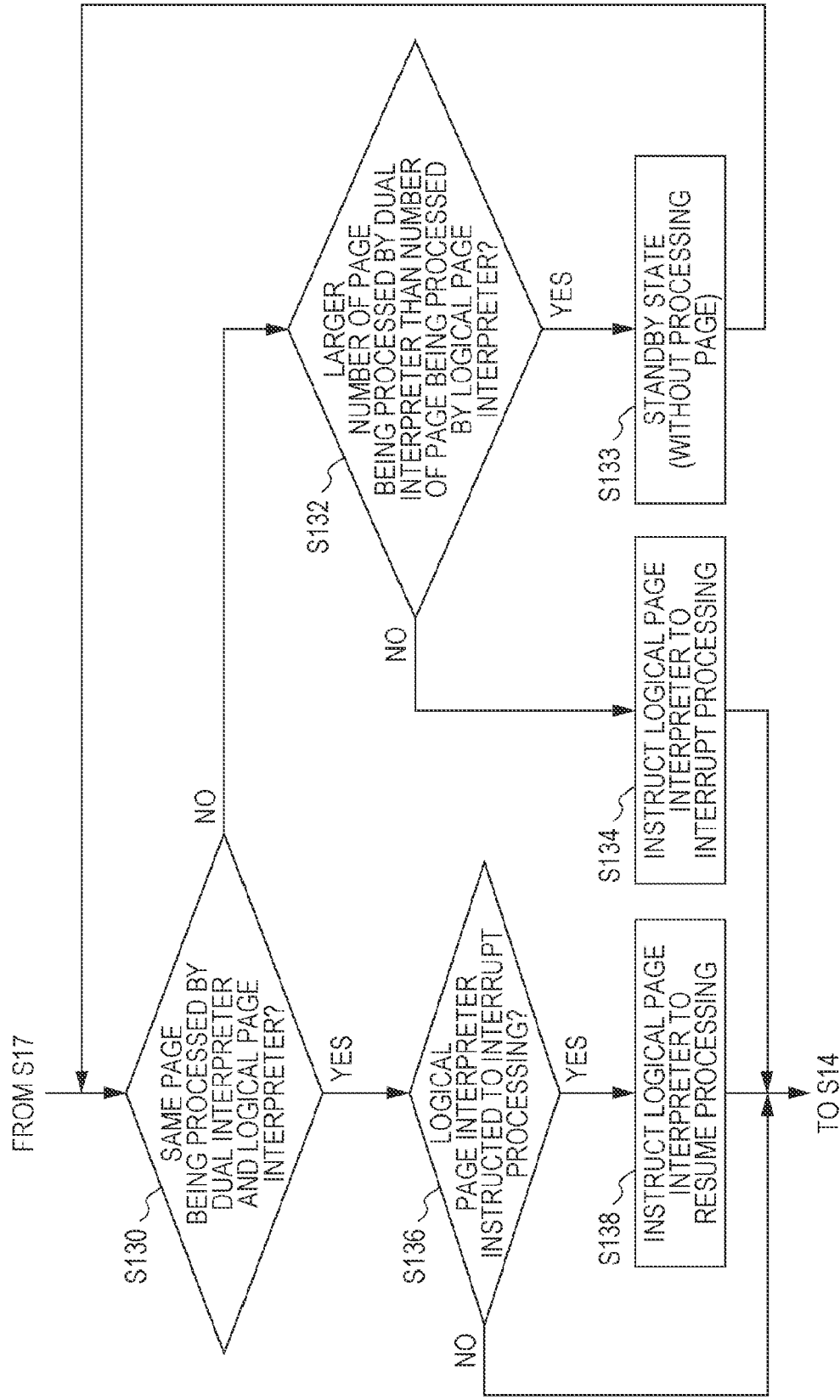
FIG. 22 illustrates an example of a processing procedure of the page synchronization process performed by the dual interpreter having an interprocess communication mode according to the third exemplary modification.

FIG. 22 illustrates an example of the processing procedure of the page synchronization process (S18). In the illustrated example, the dual interpreter 36-$f$ determines whether the number Nf of the page currently being processed by the dual interpreter 36-$f$ is equal to the largest number Np of the numbers of the pages currently being processed by the multiple logical page interpreters 36-$p$ (S130). The values Nf and Np may be obtained by querying the page distributor 34. If the values Nf and Np are not equal, the processing of forms and the processing of logical pages are not synchronous. In this case, the dual interpreter 36-$f$ further compares the values Nf and Np, and determines whether the value Nf is larger than the value Np (S132).

If the determination result is negative (NO), this implies that the process for interpreting the logical pages takes place ahead of the process for interpreting forms. Thus, the dual interpreter 36-$f$ instructs each of the logical page interpreters 36-$p$ to interrupt the processing (S134). Upon receipt of the instruction, each of the logical page interpreters 36-$p$ suspends the processing immediately after, for example, completing the generation of intermediate data for the page currently being processed, and enters a standby state without requesting the page distributor 34 to distribute the subsequent page. The suspension of the processing continues until a process resume instruction is received. After the process of S134, the dual interpreter 36-$f$ proceeds to S14 (FIG. 21), and performs a process for interpreting the form in the current page and generating intermediate data. Upon assignment of the subsequent page (S12 in FIG. 21), the dual interpreter 36-$f$ performs the page synchronization process illustrated in FIG. 22 because it is still in the state where the "switching of the operation mode is in progress". In this manner, the processing loop of S130, S132, S134, S14, S12, S17, and S130 in this order is repeatedly performed until the dual interpreter 36-$f$ that is performing processing overtakes the logical page interpreters 36-$p$ that are suspending their operation.

When the progress of the processing performed by the dual interpreter 36-$f$ overtakes the progress of the processing performed by the logical page interpreters 36-$p$, the determination result of S130 is positive (YES). In this case, the dual interpreter 36-$f$ exits the state where the "switching of the operation mode is in progress", and switches its operation mode. The dual interpreter 36-$f$ further determines whether a process interrupt instruction has been issued to the logical page interpreters 36-$p$ (S136). If a process interrupt instruction has been issued, the dual interpreter 36-$f$ issues a process resume instruction to the logical page interpreters 36-$p$ (S138). In response to the process resume instruction, each of the logical page interpreters 36-$p$ switches its operation mode, and resumes the processing.

If the determination result of S132 is positive (YES), the dual interpreter 36-$f$ enters a standby state without processing the page assigned in S12 (S133), and then returns to S130. In this manner, the processing loop of S130, S132, S133, S12, S17, and S130 in this order is repeatedly performed until the logical page interpreters 36-$p$ that are performing processing catch up with the progress of the dual interpreter 36-$f$ that is in a standby state. When the logical page interpreters 36-$p$ catch up with the progress of the dual interpreter 36-$f$, the determination result of S130 is positive (YES). Then, the dual interpreter 36-$f$ switches its operation mode, and also instructs each of the logical page interpreters 36-$p$ to switch the operation mode of the logical page interpreter 36-$p$.

The page synchronization process described above is an example. The page synchronization process is performed when an operation mode is switched, thus allowing the processing in the operation mode after switching to start with a state where the dual interpreter 36-$f$ and the logical page interpreters 36-$p$ keep pace with each other.

For example, the logical page interpreters 36-$p$ are processing, in the non-interprocess communication mode, pages whose numbers are larger than the number of the page currently being processed by the dual interpreter 36-$f$. At this time point, it is probable that intermediate data of a page including a cache reference command for referring to cache data that has not been created is present in the intermediate data buffer 42. It is assumed that, at this time point, the operation mode is switched from the non-interprocess communication mode to the interprocess communication mode because the total amount of cache data has approached the capacity of the form cache 48. In this case, it may be possible to delete existing cache data from the form cache 48 in order to store newly generated cache data in the form cache 48 in accordance with the switching to the interprocess communication mode. Accordingly, cache data referred to by a page that is stored in the intermediate data buffer 42 and that has not been processed by the renderer 44 may be deleted from the form cache 48, resulting in the possibility that an image in the page will not be generated.

In addition, the logical page interpreters 36-$p$ are processing, in the interprocess communication mode, pages whose numbers are larger than the number of the page currently being processed by the dual interpreter 36-$f$. In this situation, in response to a query regarding the presence or absence of cache data of a newly appearing form from one of the logical page interpreters 36-$p$, the cache management unit 38 returns a response indicating "no cache data", and the corresponding logical page interpreter 36-$p$ creates intermediate data that does not refer to a cache (including intermediate data of the form). After that, the cache data of the form may be registered in the form cache 48 at the time when the dual interpreter 36-$f$ processes the form. However, it is difficult to determine whether the registered cache data will be used for subsequent pages. In this manner, it is probable that cache data that may not possibly be referred to is registered.

The inconveniences described above by way of example may be addressed by performing a page synchronization process during the switching of the operation mode.

In the example illustrated in FIG. 22, page synchronization is performed so that the pages being processed by the logical page interpreters 36-$p$ and the dual interpreter 36-$f$ have the same page number. This is merely an example. Alternatively, synchronization may be performed so that the dual interpreter 36-$f$ is processing a page whose page number is slightly larger than the page numbers of the pages being processed by the logical page interpreters 36-$p$. That is, if the progress of processing performed by the dual interpreter 36-$f$ is slightly ahead of the progress of processing performed by the logical page interpreters 36-$p$, cache data of forms included in the pages being processed by the logical page interpreters 36-$p$ is substantially always present in the form cache 48 regardless of either the non-interprocess communication mode or the interprocess communication mode. This may enable the most effective use of the effect of parallel processing and utilization of cache, and enable high-speed processing. If the progress of processing performed by the dual interpreter 36-$f$ is largely ahead of the progress of processing performed by the logical page interpreters 36-$p$, it is probable that the cache data created by the dual interpreter 36-$f$ may be deleted because of acute shortage of the available capacity of the cache and the like before the cache data is used to render a logical page. Such an inconvenience may be addressed by performing synchronization during the switching of the operation mode so that the progress of processing performed by the dual interpreter 36-$f$ is slightly ahead of the progress of processing performed by the logical page interpreters 36-$p$, and high-speed processing may be provided.

Alternatively, page synchronization may be performed within a certain amount of range so that the page number of the page being processed by the dual interpreter 36-$f$ is the same as or is slightly larger than the page numbers of the pages being processed by the logical page interpreters 36-$p$.

In the example illustrated in FIGS. 21 and 22, the dual interpreter 36-$f$ executes a page synchronization process. Instead of this, the page distributor 34 may perform a page synchronization process or a function module dedicated for the page synchronization process may be provided.

The form cache 48 and the cache management unit 38 may not necessarily be reset (or cleared) at the time of switching from the interprocess communication mode to the non-interprocess communication mode. After switching, the dual interpreter 36-$f$ may query the cache management unit 38 about the presence or absence of the cache entry corresponding to the form each time the dual interpreter 36-$f$ finds a form to be cached from PDL data.

In addition, the access count value of each cache entry may be reset at the time of switching from the interprocess communication mode to the non-interprocess communication mode. This may be effective particularly for the operation mode switching method illustrated in FIG. 19. Resetting of the access count value when the operation mode is switched to the non-interprocess communication mode in S1052 in response to the detection of a reduction in the hit ratio of the cache in S1048 allows the information on the number of times access has been made to be cleared. The access count value may reflect a more recent state of use of the cache, leading to an increase in cache use efficiency.

In addition, the form cache 48 and the cache management unit 38 may not necessarily be reset (or cleared) at the time of switching from the non-interprocess communication mode to the interprocess communication mode. After switching, the dual interpreter 36-f may inform the cache management unit 38 of whether to cache intermediate data of a form.

An example of the overall processing procedure for the dual interpreter 36-f has been described with reference to FIGS. 21 and 22. The overall processing procedure for each of the logical page interpreters 36-p according to the third exemplary modification may be similar to the procedure illustrated in FIG. 7.

Next, an example of a command-by-command processing procedure for each of the logical page interpreters 36-p (the detailed procedure of S22 in FIG. 7) according to the third exemplary modification will be described with reference to FIG. 23. In the procedure illustrated in FIG. 23, the processes of S41 and S44 are added to the procedure according to the exemplary embodiment illustrated by way of example in FIG. 9.

Figure 23:
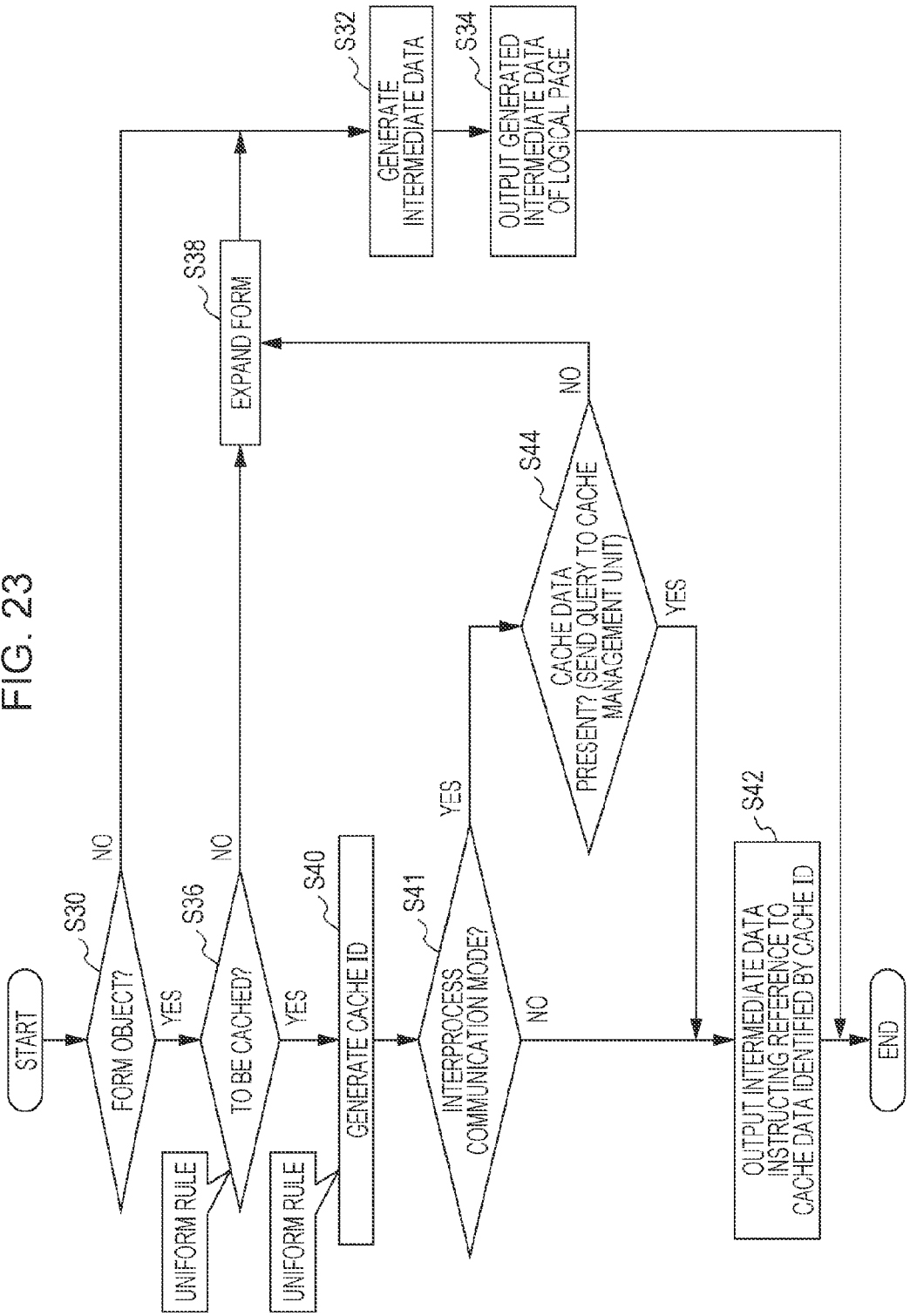
FIG. 23 illustrates an example of a command-by-command processing procedure for a logical page interpreter having an interprocess communication mode according to the third exemplary modification.

In the procedure illustrated in FIG. 23, an individual logical page interpreter 36-p generates a cache ID corresponding to a form (S40), and then determines whether the current operation mode is the interprocess communication mode (S41).

If the current operation mode is the interprocess communication mode, the logical page interpreter 36-p performs interprocess communication, and sends a query request to the cache management unit 38 using the cache ID as an argument, thereby querying whether the cache data corresponding to the cache ID is present in the form cache 48 (S44). If a response indicating "the corresponding cache data is present" is sent from the cache management unit 38 in response to the query (the determination result of S44 is positive (YES)), the logical page interpreter 36-p proceeds to S42, and generates and outputs a reference command for referring to the cache ID. If a response indicating "the corresponding cache data is not present" is returned in response to the query, the logical page interpreter 36-p expands the PDL data of the form onto the memory (S38), interprets the PDL data to generate intermediate data of the form (S32), and outputs the generated intermediate data (S34). In the interprocess communication mode, therefore, whether cache data is present in the form cache 48 is checked, and a command for referring to the cache data is created only when it is confirmed that the cache data is present.

If the current operation mode is the non-interprocess communication mode (the determination result of S41 is negative (NO)), the logical page interpreter 36-p proceeds to S42, in which the logical page interpreter 36-p generates a reference command for referring to the cache ID, and outputs the reference command. In the non-interprocess communication mode, since it is guaranteed that necessary cache data is obtainable, a command for referring to cache data is created without querying the cache management unit 38. This processing is substantially the same as that illustrated in FIG. 9 according to the exemplary embodiment described above.

Next, an example of a command-by-command processing procedure for the dual interpreter 36-f (the detailed procedure of S22 in FIG. 21) will be described with reference to FIG. 24. In the procedure illustrated in FIG. 24, the processes of S55, S57, and S60 to S66 are added to the procedure in the exemplary embodiment illustrated by way of example in FIG. 10.

Figure 24:
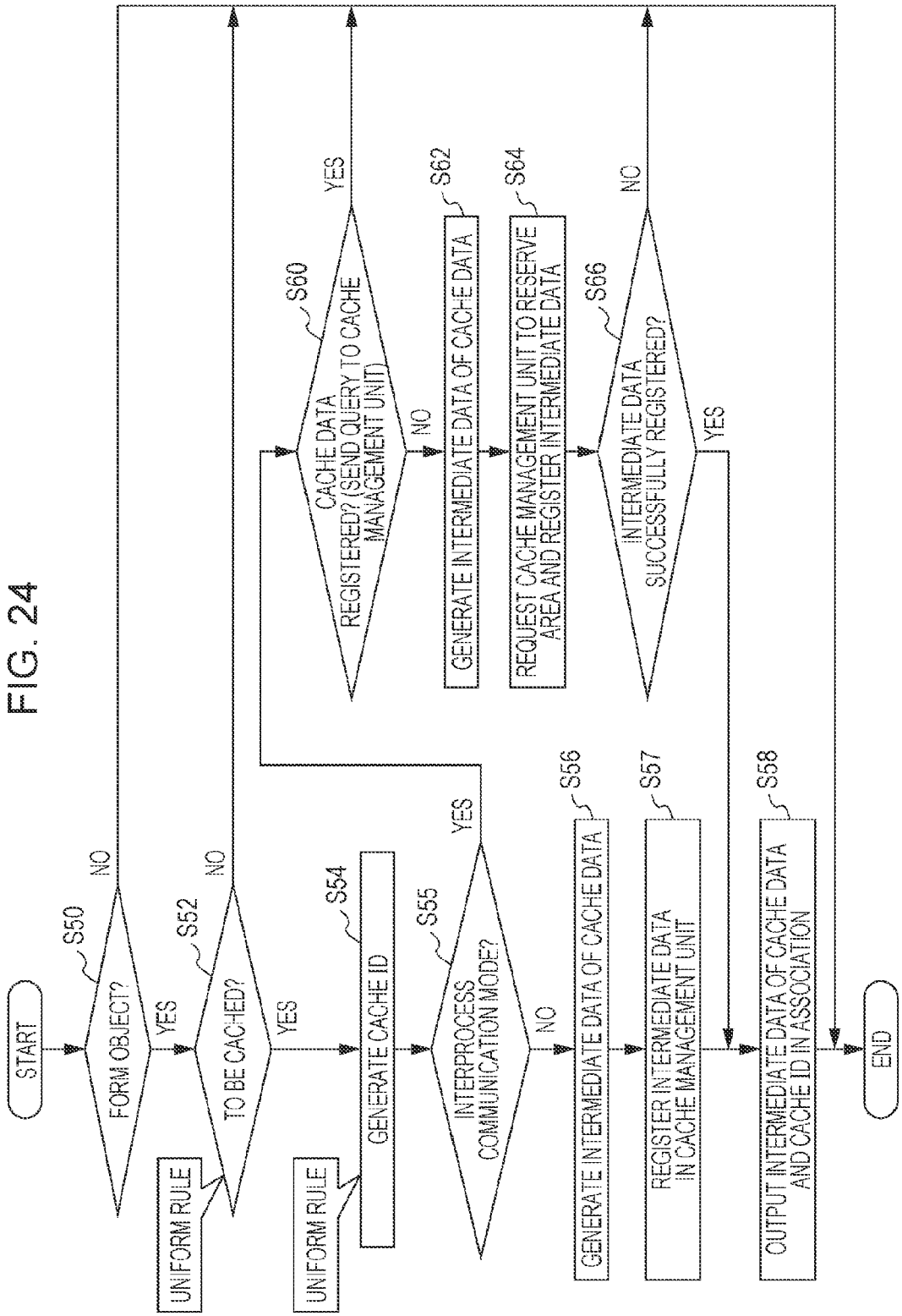
FIG. 24 illustrates an example of a command-by-command processing procedure for the dual interpreter having an interprocess communication mode according to the third exemplary modification.

In the procedure illustrated in FIG. 24, the dual interpreter 36-f generates a cache ID corresponding to a form (S54), and then determines whether the current operation mode is the interprocess communication mode (S55).

If the current operation mode is the non-interprocess communication mode (the determination result of S55 is negative (NO)), the dual interpreter 36-f generates intermediate data of the form (S56), and sends a registration request to the cache management unit 38 to register the intermediate data in the form cache 48 as cache data (S57). In response to the registration request, the cache management unit 38 registers information on the cache data in the cache management unit 38. Then, the dual interpreter 36-f sends the created intermediate data to the form cache 48 in association with the corresponding cache ID, thereby registering the cache data (S58). In the processes of S57 and S58, as in the exemplary embodiment described above, the dual interpreter 36-f queries the cache management unit 38 as to whether the cache data of the form has been registered, and does not redundantly register the cache data if the cache data has been registered. In this manner, the processing in the non-interprocess communication mode is basically the same as the processing according to the exemplary embodiment described above illustrated in FIG. 10.

If the current operation mode is the interprocess communication mode (the determination result of S55 is positive (YES)), the dual interpreter 36-f sends a query request to the cache management unit 38 using the cache ID as an argument to query whether the cache data corresponding to the cache ID is present in the form cache 48 (S60). If a response indicating "the corresponding cache data is present" is sent from the cache management unit 38 in response to the query (the determination result of S60 is positive (YES)), the dual interpreter 36-f terminates the process to avoid the generation and registration of the same cache data for redundancy.

If a response indicating "the corresponding cache data is not present" is sent from the cache management unit 38 in response to the query in S60, the dual interpreter 36-f generates intermediate data of the form (S62), and sends an area reservation request including the size of the generated intermediate data and the cache ID to the cache management unit 38. If a response indicating "successful area reservation" is returned in response to the request, the dual interpreter 36-f sends a registration request to the cache management unit 38 to register the intermediate data (S64). Since it is possible to register the created intermediate data of the form in the form cache 48 (the determination result of S66 is positive (YES)), the dual interpreter 36-f sends the intermediate data to the form cache 48 in association with the cache ID (S58). If a response indicating "area reservation failure" is sent from the cache management unit 38 in response to the area reservation request, the determination result of S66 is negative (NO), and the dual interpreter 36-f terminates the process without registering the generated intermediate data of the form in the cache management unit 38 and the form cache 48.

An example of the processing procedure for the front-end device 30 according to this exemplary modification has been described. The processing procedure for the back-end device 40 (particularly, the renderer 44) according to this exemplary modification is similar to that in the exemplary embodiment described above (see FIGS. 11 and 12).

Exemplary embodiments of the present invention and their exemplary modifications have been described. The exemplary embodiments and exemplary modifications described above are merely examples to help understand the present invention, and the scope of the present invention is not limited to the exemplary embodiments and exemplary modifications described above. For example, in the exemplary embodiments and exemplary modifications described above, the form cache 48 is provided in the back-end device 40; this is merely an example. The form cache 48 may be located in any place that is accessible from each of the interpreters 36 and the renderer 44. While in the exemplary embodiments and exemplary modifications described above, one renderer 44 is used, multiple renderers 44 may be used.

In the exemplary embodiments and exemplary modifications described above, furthermore, the front-end device 30 includes two types of interpreters 36, that is, the logical page interpreters 36-*p* and the dual interpreter 36-*f*, by way of example. This is merely an example. Alternatively, multiple common interpreters 36 each having all the modes, that is, the page processing mode 1, the page processing mode 2, and the cache mode (and, in the exemplary modifications, additionally, the interprocess communication mode for each of the logical page interpreters 36-*p* and the dual interpreter 36-*f* (FIGS. 23 and 24)) may be activated. One or more of these interpreters 36 may be used as a dual interpreter or interpreters 36-*f*, and the others may be used as logical page interpreters 36-*p*.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print image processing system comprising:
    a plurality of logical page interpretation units that interpret assigned logical pages to be processed in input print data in parallel to obtain interpretation results;
    a dual interpretation unit that interprets an assigned logical page to be processed in the print data or interprets an element to be cached which is included in the logical page to obtain an interpretation result;
    a cache memory that stores interpretation results of elements to be cached;
    an assignment unit that assigns a logical page to be processed to each of the plurality of logical page interpretation units and assigns a logical page to be processed to the dual interpretation unit; and
    a print image data generation unit that generates print image data for the logical pages to be processed, using the interpretation results of the logical pages output from the logical page interpretation units or the interpretation result of the logical page output from the dual interpretation unit and using the interpretation results of the elements to be cached stored in the cache memory, the print image data generation unit supplying the generated print image data to a printer,
    each of the plurality of logical page interpretation units having a first page processing mode and a second page processing mode,
        the first page processing mode being a mode in which a logical page to be processed is interpreted to obtain an interpretation result and the interpretation result is output, wherein in a case where the logical page to be processed includes an element to be cached, the element to be cached is further interpreted to obtain an interpretation result and the interpretation result is incorporated into the interpretation result of the logical page to be processed,
        the second page processing mode being a mode in which a logical page to be processed is interpreted to obtain an interpretation result and the interpretation result is output, wherein in a case where the logical page to be processed includes an element to be cached, a cache reference command including cache identification information that is generated from data of the element to be cached in accordance with a predetermined generation rule is generated without the element to be cached being interpreted, and the generated cache reference command is incorporated into the interpretation result of the logical page to be processed as an interpretation result of the element to be cached,
    the dual interpretation unit having the first page processing mode and a cache mode,
        the cache mode being a mode in which, in response to detection of an element to be cached for which an interpretation result has not been stored in the cache memory, the detected element to be cached is interpreted to obtain an interpretation result and the interpretation result is stored in the cache memory in association with cache identification information that is generated from data of the element to be cached in accordance with the generation rule,
    the plurality of logical page interpretation units and the dual interpretation unit operating in the first page processing mode in a case where the amount of progress of interpretation of the print data is less than or equal to a predetermined threshold value,
    the plurality of logical page interpretation units operating in the second page processing mode and the dual interpretation unit operating in the cache mode in a case where the amount of progress of interpretation of the print data is greater than the threshold value.

2. The print image processing system according to claim 1, wherein
    the dual interpretation unit further has the second page processing mode, and
    the print image processing system further comprises a unit that switches an operation mode of the dual interpretation unit from the cache mode to the second page processing mode in a case where the dual interpretation unit in the cache mode completes processing of the last logical page in the print data.

3. The print image processing system according to claim 2, wherein
    the plurality of logical page interpretation units and the dual interpretation unit operate in the first page processing mode while the plurality of logical page interpretation units and the dual interpretation unit are each interpreting an initial logical page assigned thereto by the assignment unit,
    the plurality of logical page interpretation units operate in the second page processing mode while the plurality of logical page interpretation units are each interpreting second and subsequent logical pages assigned thereto by the assignment unit, and
    the dual interpretation unit operates in the cache mode while the dual interpretation unit is interpreting second and subsequent logical pages assigned thereto by the assignment unit.

4. The print image processing system according to claim 1, wherein
    in the first page processing mode,
        in a case where a logical page to be processed includes an element to be cached,
            each of the plurality of logical page interpretation units interprets the element to be cached to obtain an interpretation result, and incorporates the interpretation result into an interpretation result of the logical page to be processed, and the dual interpretation unit interprets the element to be cached to obtain an interpretation result, and incorporates the interpretation result into an interpretation result of the logical page to be processed, and in a case where the interpretation result of the element to be cached has not been stored in the cache memory, each of the plurality of logical page interpretation units stores the interpretation result of the element to be cached in the cache memory in association with cache identification information that is generated from data of the element to be cached in accordance with the generation rule, and the dual interpretation unit stores the interpretation result of the element to be cached in the cache memory in association with cache identification information that is generated from data of the element to be cached in accordance with the generation rule.

5. The print image processing system according to claim 4, wherein the plurality of logical page interpretation units and the dual interpretation unit operate in the first page processing mode while the plurality of logical page interpretation units and the dual interpretation unit are each interpreting an initial logical page assigned thereto by the assignment unit, the plurality of logical page interpretation units operate in the second page processing mode while the plurality of logical page interpretation units are each interpreting second and subsequent logical pages assigned thereto by the assignment unit, and the dual interpretation unit operates in the cache mode while the dual interpretation unit is interpreting second and subsequent logical pages assigned thereto by the assignment unit.

6. The print image processing system according to claim 1, further comprising:

a cache management unit that manages management information on an interpretation result of an element to be cached which is stored in the cache memory; and a unit that monitors an available capacity of the cache memory and that switches an operation mode of the plurality of logical page interpretation units to a third page processing mode in a case where the available capacity of the cache memory is lower than a predetermined threshold value while the plurality of logical page interpretation units operate in the second page processing mode, wherein in the third page processing mode, each of the plurality of logical page interpretation units queries the cache management unit as to whether the cache memory has an interpretation result of an element to be cached that is included in a logical page to be processed, in a case where it is determined as a result of the query that the cache memory has an interpretation result of the element to be cached, the logical page interpretation unit generates a cache reference command including cache identification information which is generated from data of the element to be cached in accordance with the generation rule, and incorporates the generated cache reference command, as an interpretation result of the element to be cached, into an interpretation result of the logical page to be processed, and in a case where it is determined as a result of the query that the cache memory does not have an interpretation result of the element to be cached, the logical page interpretation unit interprets the element to be cached to obtain an interpretation result, and incorporates the interpretation result into an interpretation result of the logical page to be processed.

7. The print image processing system according to claim 6, further comprising a batch deletion unit that deletes interpretation results of elements to be cached from the cache memory in a batch, wherein the batch deletion unit monitors a hit ratio of the cache memory and a condition of use of intermediate data of elements to be cached which are stored in the cache memory, the hit ratio being a ratio of the number of interpretation results of elements to be cached which have been stored in the cache memory to a total number of interpretation results of elements to be cached for which a query has been made by the plurality of logical page interpretation units, in a case where the hit ratio is lower than a predetermined determination threshold value while the plurality of logical page interpretation units operate in the third page processing mode, the batch deletion unit identifies, using the condition of use of the intermediate data of the elements to be cached, a group of elements to be cached for which intermediate data has recently been used less frequently than a predetermined threshold value, and deletes the intermediate data of the identified group of elements to be cached from the cache memory in a batch.

8. The print image processing system according to claim 7, further comprising a unit that switches the operation mode of the plurality of logical page interpretation units from the third page processing mode to the second page processing mode in accordance with deletion performed by the batch deletion unit.

9. The print image processing system according to claim 8, wherein the plurality of logical page interpretation units and the dual interpretation unit operate in the first page processing mode while the plurality of logical page interpretation units and the dual interpretation unit are each interpreting an initial logical page assigned thereto by the assignment unit, the plurality of logical page interpretation units operate in the second page processing mode while the plurality of logical page interpretation units are each interpreting second and subsequent logical pages assigned thereto by the assignment unit, and the dual interpretation unit operates in the cache mode while the dual interpretation unit is interpreting second and subsequent logical pages assigned thereto by the assignment unit.

10. The print image processing system according to claim 7, wherein the plurality of logical page interpretation units and the dual interpretation unit operate in the first page processing mode while the plurality of logical page interpretation units and the dual interpretation unit are each interpreting an initial logical page assigned thereto by the assignment unit, the plurality of logical page interpretation units operate in the second page processing mode while the plurality of logical page interpretation units are each interpreting second and subsequent logical pages assigned thereto by the assignment unit, and the dual interpretation unit operates in the cache mode while the dual interpretation unit is interpreting second and subsequent logical pages assigned thereto by the assignment unit.

11. The print image processing system according to claim 6, wherein
- the plurality of logical page interpretation units and the dual interpretation unit operate in the first page processing mode while the plurality of logical page interpretation units and the dual interpretation unit are each interpreting an initial logical page assigned thereto by the assignment unit,
- the plurality of logical page interpretation units operate in the second page processing mode while the plurality of logical page interpretation units are each interpreting second and subsequent logical pages assigned thereto by the assignment unit, and
- the dual interpretation unit operates in the cache mode while the dual interpretation unit is interpreting second and subsequent logical pages assigned thereto by the assignment unit.

12. The print image processing system according to claim 1, wherein
- the plurality of logical page interpretation units and the dual interpretation unit operate in the first page processing mode while the plurality of logical page interpretation units and the dual interpretation unit are each interpreting an initial logical page assigned thereto by the assignment unit,
- the plurality of logical page interpretation units operate in the second page processing mode while the plurality of logical page interpretation units are each interpreting second and subsequent logical pages assigned thereto by the assignment unit, and
- the dual interpretation unit operates in the cache mode while the dual interpretation unit is interpreting second and subsequent logical pages assigned thereto by the assignment unit.

13. The print image processing system according to claim 1, wherein
- the plurality of logical page interpretation units and the dual interpretation unit are configured as interpretation units, which are identical, each having the first page processing mode, the second page processing mode, and the cache mode, and
- at least one interpretation unit selected from the interpretation units is used as the dual interpretation unit, and the other interpretation units are used as the plurality of logical page interpretation units.

14. A non-transitory computer readable medium storing a program causing a computer to execute a process, the process comprising:
- operating a plurality of logical page interpretation units to interpret assigned logical pages to be processed in input print data in parallel to obtain interpretation results;
- operating a dual interpretation unit to interpret an assigned logical page to be processed in the print data or interprets an element to be cached which is included in the logical page to obtain an interpretation result;
- storing in a cache memory interpretation results of elements to be cached;
- assigning a logical page to be processed to each of the plurality of logical page interpretation units;
- assigning a logical page to be processed to the dual interpretation unit;
- generating print image data for the logical pages to be processed, using the interpretation results of the logical pages output from the logical page interpretation units or the interpretation result of the logical page output from the dual interpretation unit and using the interpretation results of the elements to be cached stored in the cache memory; and
- supplying the generated print image data to a printer, wherein
- each of the plurality of logical page interpretation units has a first page processing mode and a second page processing mode,
  - the first page processing mode being a mode in which a logical page to be processed is interpreted to obtain an interpretation result and the interpretation result is output, wherein in a case where the logical page to be processed includes an element to be cached, the element to be cached is further interpreted to obtain an interpretation result and the interpretation result is incorporated into the interpretation result of the logical page to be processed,
  - the second page processing mode being a mode in which a logical page to be processed is interpreted to obtain an interpretation result and the interpretation result is output, wherein in a case where the logical page to be processed includes an element to be cached, a cache reference command including cache identification information that is generated from data of the element to be cached in accordance with a predetermined generation rule is generated without the element to be cached being interpreted, and the generated cache reference command is incorporated into the interpretation result of the logical page to be processed as an interpretation result of the element to be cached,
- the dual interpretation unit has the first page processing mode and a cache mode,
  - the cache mode being a mode in which, in response to detection of an element to be cached for which an interpretation result has not been stored in the cache memory, the detected element to be cached is interpreted to obtain an interpretation result and the interpretation result is stored in the cache memory in association with cache identification information that is generated from data of the element to be cached in accordance with the generation rule,
- the plurality of logical page interpretation units and the dual interpretation unit operate in the first page processing mode in a case where the amount of progress of interpretation of the print data is less than or equal to a predetermined threshold value, and
- the plurality of logical page interpretation units operate in the second page processing mode and the dual interpretation unit operates in the cache mode in a case where the amount of progress of interpretation of the print data is greater than the threshold value.

15. A non-transitory computer readable medium storing a program causing a computer to execute a process, the process comprising:
- operating a plurality of logical page interpretation units to interpret assigned logical pages to be processed in input print data in parallel to obtain interpretation results;
- operating a dual interpretation unit to interpret an assigned logical page to be processed in the print data or interprets an element to be cached which is included in the logical page to obtain an interpretation result;
- storing in a cache memory interpretation results of elements to be cached;
- assigning a logical page to be processed to each of the plurality of logical page interpretation units; and
- assigning a logical page to be processed to the dual interpretation unit, the process cooperating with
- generation of print image data for the logical pages to be processed, using the interpretation results of the logical pages output from the logical page interpretation units or the interpretation result of the logical page output from the dual interpretation unit and using the interpretation results of the elements to be cached stored in the cache memory, and
- supply of the generated print image data to a printer, wherein each of the plurality of logical page interpretation units has a first page processing mode and a second page processing mode,
- the first page processing mode being a mode in which a logical page to be processed is interpreted to obtain an interpretation result and the interpretation result is output, wherein in a case where the logical page to be processed includes an element to be cached, the element to be cached is further interpreted to obtain an interpretation result and the interpretation result is incorporated into the interpretation result of the logical page to be processed,
- the second page processing mode being a mode in which a logical page to be processed is interpreted to obtain an interpretation result and the interpretation result is output, wherein in a case where the logical page to be processed includes an element to be cached, a cache reference command including cache identification information that is generated from data of the element to be cached in accordance with a predetermined generation rule is generated without the element to be cached being interpreted, and the generated cache reference command is incorporated into the interpretation result of the logical page to be processed as an interpretation result of the element to be cached, the dual interpretation unit has the first page processing mode and a cache mode,
- the cache mode being a mode in which, in response to detection of an element to be cached for which an interpretation result has not been stored in the cache memory, the detected element to be cached is interpreted to obtain an interpretation result and the interpretation result is stored in the cache memory in association with cache identification information that is generated from data of the element to be cached in accordance with the generation rule, the plurality of logical page interpretation units and the dual interpretation unit operate in the first page processing mode in a case where the amount of progress of interpretation of the print data is less than or equal to a predetermined threshold value, and the plurality of logical page interpretation units operate in the second page processing mode and the dual interpretation unit operates in the cache mode in a case where the amount of progress of interpretation of the print data is greater than the threshold value.

\* \* \* \* \*